United States Patent
Sloan et al.

(10) Patent No.: US 9,827,872 B1
(45) Date of Patent: Nov. 28, 2017

(54) HYBRID AND ELECTRIC BATTERY CELL REBALANCER

(71) Applicant: Torque Electric LLC, San Jose, CA (US)

(72) Inventors: Jeff Sloan, San Jose, CA (US); Elisha Pruett, Portland, OR (US); Ronnie Ganitano, San Jose, CA (US); Tim Williams, Cudahy, WI (US)

(73) Assignee: Torque Electric LLC, San Jose, CA (US)

( * ) Notice: Subject to any disclaimer, the term of this patent is extended or adjusted under 35 U.S.C. 154(b) by 183 days.

(21) Appl. No.: 14/718,434

(22) Filed: May 21, 2015

Related U.S. Application Data

(60) Provisional application No. 62/002,167, filed on May 22, 2014.

(51) Int. Cl.
*H02J 7/00* (2006.01)
*B60L 11/18* (2006.01)

(52) U.S. Cl.
CPC ....... *B60L 11/1874* (2013.01); *B60L 11/1861* (2013.01)

(58) Field of Classification Search
CPC ................................... B60L 11/1874
USPC .......................................................... 320/109
See application file for complete search history.

(56) References Cited

U.S. PATENT DOCUMENTS

| | | | | |
|---|---|---|---|---|
| 2005/0091549 A1* | 4/2005 | Wu | ............ | G06F 1/3215 713/320 |
| 2008/0280192 A1* | 11/2008 | Drozdz | ............ | B60K 6/28 429/62 |
| 2013/0009602 A1* | 1/2013 | Hoff | ............ | H02J 7/0021 320/126 |
| 2013/0179012 A1* | 7/2013 | Hermann | ............ | B60L 3/0046 701/22 |
| 2014/0012447 A1* | 1/2014 | Gao | ............ | B60L 11/1874 701/22 |
| 2015/0291054 A1* | 10/2015 | Duan | ............ | B60L 11/1874 429/50 |
| 2016/0351981 A1* | 12/2016 | Porras | ............ | H01M 10/6569 |

* cited by examiner

*Primary Examiner* — Suresh Memula
(74) *Attorney, Agent, or Firm* — Altera Law Group, LLC

(57) ABSTRACT

A hybrid vehicle battery cell rebalancer for hybrid vehicles used to restore cell balance and improve performance while cooling and protecting the hybrid battery against damage from the rebalancing process. This may be accomplished by charging and/or discharging the battery cells in the hybrid battery pack at the same time while powering and controlling the vehicle's hybrid battery cooling fan.

10 Claims, 17 Drawing Sheets

Module Pin Descriptions

Figure 1:
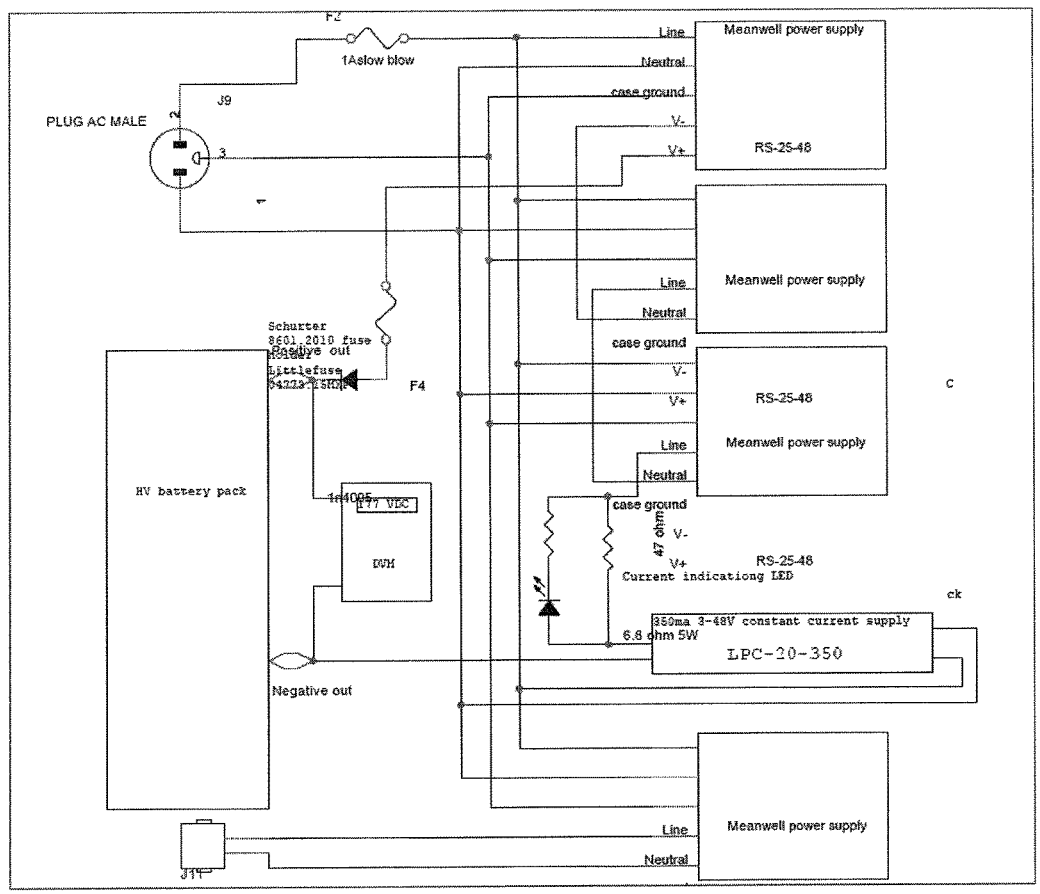

| Module | Pin | Dir. | Function | Range |
|---|---|---|---|---|
| Function | VI | In | Battery voltage (scaled) | 0-5 V |
| | VC | Out | Current command (DC transfer function) | 0-5 V |
| | EN | In | Enable (active low) | 0/12 V CMOS logic |
| Current Sink | VC_IN | In | Current command | 0-5 V |
| | VO_IN | In | Battery voltage (scaled) | 0-5 V |
| | EN | In | Enable (active low) | 0/12 V CMOS logic |
| | VOUT_P | Load | Battery (+) | - |
| | VOUT_N | Load | Battery (-) | - |
| | IOUT | Out | Actual Current | 0-5 V |
| Linear Sink | IN_P | In | Current command | 0-5 V |
| | IN_N | In | Current feedback | 0-5 V |
| | EN | In | Enable (active low) | 0/12 V CMOS logic |
| | VO | Load | Battery (+) | - |
| Resistor Switch | A | Out | Pullup resistor | - |
| | H | Out | Hysteresis | 0/0.12 mA |
| | Y | In | Input (active high) | 0/12 V CMOS logic |
| | VO | Load | Battery (+) | - |

Figure 4

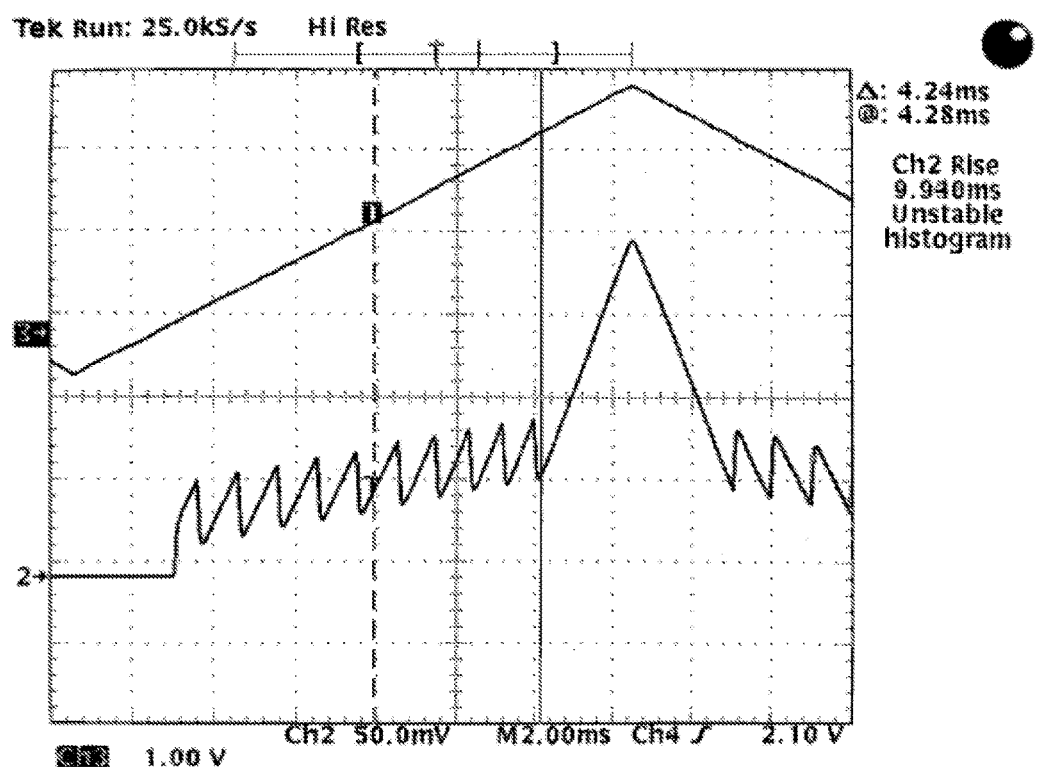
Fig 9A Current too high.

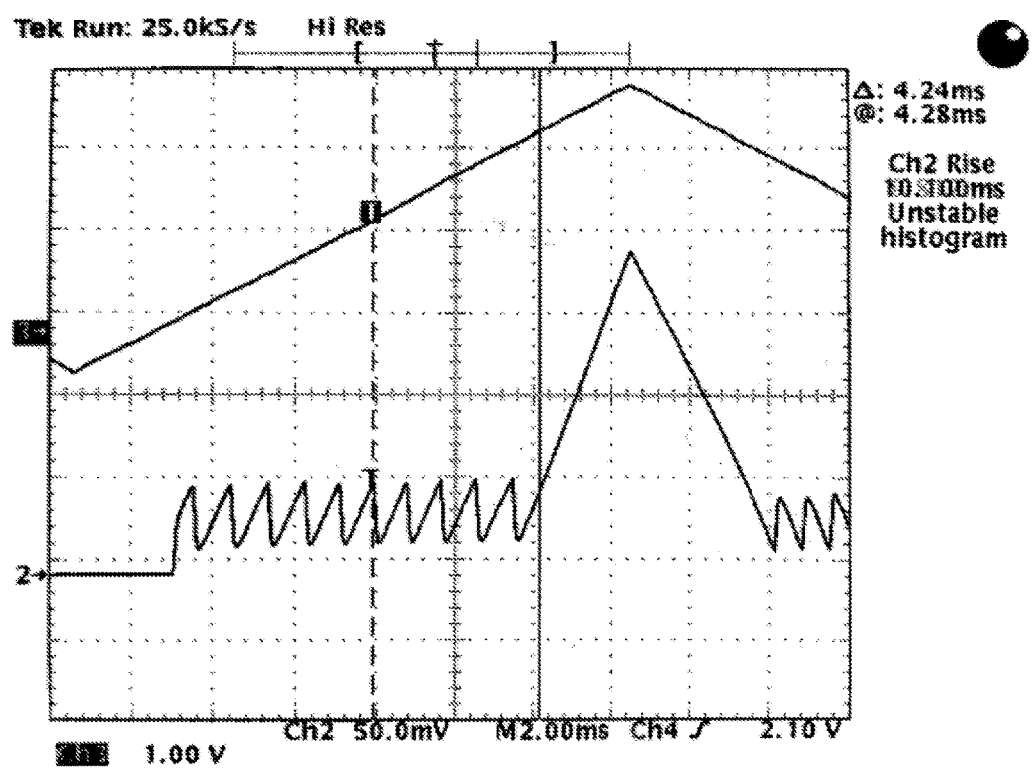
Fig 9B Optimal Setting.

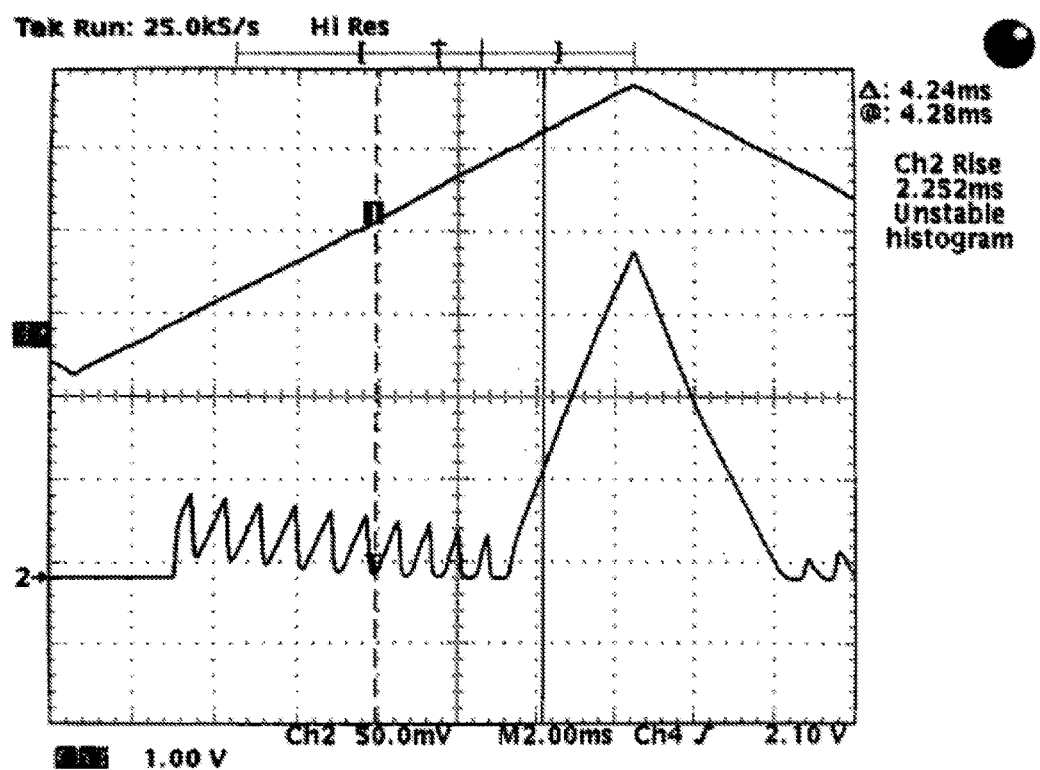
Fig 9C Current too low.

HYBRID AND ELECTRIC BATTERY CELL REBALANCER

CROSS-REFERENCE TO RELATED APPLICATIONS

This application claims the benefit of the filing date of U.S. application Ser. No. 62/002,167, filed on May 22, 2014, the disclosure of which is incorporated by reference herein in its entirety.

BACKGROUND

Transportation system, such as vehicles, may be powered partially or completely by electrical motors with energy stored in rechargeable batteries. Likewise, non-transportation devices may similarly be electric powered with rechargeable batteries a source of power. Many hybrid vehicles in use today in the United States and around the world use Nickel Metal Hydride high voltage hybrid traction batteries (NiMH). Other battery types commonly used are lead acid and lithium amongst others. While we will focus our discussion on NiMH cells, all batteries suffer from similar problems to different degrees. Multiple individual NiMH cells are combined to form the high-voltage battery 'pack' that is used to assist in vehicle propulsion and improve fuel economy. NiMH batteries normally operate in a range of 1.2-1.4 V per cell. Multiple cells are combined in series to produce the high voltage required by the vehicle. For example, the 1999-2003 Toyota Prius uses 228 individual cells (combined into six-cell modules–38 modules per pack) for a peak operating voltage of approx. 330 volts; the 2004-2009 Prius uses 168 individual cells (combined into six-cell modules–28 modules per pack) to produce a peak operating voltage of approximately 243 volts. NiMH cells are designed to have low internal resistance and low self-discharge rates, which combined with low manufacturing costs, have made them the technology of choice for hybrid vehicles during the last decade.

During normal vehicle operations, the hybrid battery cells are charged and discharged via normal vehicle use. As a result of this use, the battery cells may deteriorate over time as their lifespan is consumed. Every NiMH cell is unique and deteriorates at a slightly different rate than the other cells within the same hybrid vehicle battery pack. This is based on a variety of factors including but not limited to: Each cell's internal resistance when new & degradation over time. Each cell's self-discharge rate when new & over time may vary from the other cells in the same hybrid battery pack. The physical location of the cell within the battery pack may influence the rate of degradation—cells in the center of the hybrid battery pack often degrade more rapidly than cells on the perimeter of the battery pack. The baseline ambient temperatures of the battery pack (i.e. climate in which the vehicle operates) influences the speed at which the various factors cited may influence the cells. There are additional factors that influence the variation in deterioration rate between NiMH cells within a hybrid battery pack, the above list is not meant to be conclusive. These factors combine to allow the hybrid battery cell's voltage to drift out of sync over time. As a result the hybrid battery pack becomes 'imbalanced' with different cells being charged to different voltages.

When the imbalance between NiMH hybrid battery cells becomes large enough, most vehicles include circuits which may display a fault code. Whether the battery is, in fact, unusable or not, may be irrelevant if the diagnostics circuits within the vehicle think it is. The vehicle may display an "incurable" battery fault. The vehicle owner's current remedy options are to replace the entire battery pack as a unit or disassemble the hybrid battery pack into the individual six cell modules and recharge/replace failed cells or modules at the cell/module level.

Vehicle manufacturers also seem to determine the health of an entire battery pack by looking at the health of the strongest cell. Even though a cell may have a high voltage, it may produce little current because of accumulated resistance therein. The onboard computer in the vehicle will still perceive the battery as OK when it provides little benefit. Both circumstances are undesirable, though this one is perhaps worse because the user does not know why the battery appears Ok but fuel consumption is increased.

Practically speaking, the vehicle manufacture would prefer full replacement of the entire battery pack, which is faster than identifying weak cells. No system is provided to repair cells in place.

It is known to discharge and recharge batteries for reconditioning, but the known circuits are elemental and typical charge and discharge at fixed rates. Recharge is slow to prevent battery overheating. Use of a cooling fan at a fixed speed is also known.

Discharging has been done using incandescent lamps to run down the batteries. Such lamps have no intelligence to optimize discharge rates.

SUMMARY

The following is intended to be a brief summary of the concepts included herein and is not intended to limit the scope of the invention. The claims define the scope of the invention.

In hybrid or electric cars, the batteries are constantly charging and discharging as needed. In vehicle operation the charging and discharging rates at rapid, between 50/100 amps. This produces considerable heat and ultimately causes damage to the battery. Even though the battery may get a deep discharge when in use, its rapid recharge is damaging. Yet, rapid recharge is highly desirable because it is fast.

A hybrid vehicle battery cell rebalancer may be used to restore cell balance and improve performance while cooling and protecting the hybrid battery against damage from the rebalancing process. This may be accomplished by charging and/or discharging all of the battery cells in the hybrid battery pack at the same time.

Various embodiments of a hybrid vehicle battery cell rebalancer may include a charging sub-system, a discharging sub-system, and/or a cooling fan control subsystem.

In some embodiments, a charging sub-system may be configured to output a voltage above the rated physical maximum voltage for the battery (or cells thereof) at a fixed or variable current for a predetermined period of time, while powering and controlling the vehicle's internal hybrid battery cooling fan to remove heat generated by the cells during the rebalancing process. Applying overvoltage will assist in rebalancing (equalizing) voltage levels in each cell even if some cells have already reached their peak voltage, the weaker cells will not until overvoltage is applied. As individual cells within the hybrid battery pack charge to full, other cells within the battery pack that started the rebalancing process at a lower voltage may not yet be fully charged. The fully charged cells may transition to a state in which they convert additional charge energy to heat, while the not-yet-fully-charged cells may continue to charge.

The heat generated by the fully charged battery cells may be evacuated by a hybrid battery rebalancer's cooling fan control sub-system which may be configured to power and control the vehicle's hybrid battery cooling fan from a monitor signal in the sub-system. Eventually, all cells in the hybrid vehicle battery pack may reach their maximum physical capacity, returning all cells to a fully-charged state. At this point the cells may be in balance with each other and the cell rebalancing process may be complete. If the temperature which is sensed at the battery exceeds established safe levels, the system will taper its charge and lower its voltage until the battery temp levels return to specification. The sub-system controls the amount of cooling by, for example, pulse width modulation (PWM) of a fan. The cooling system can also run without such a feedback loop.

In some cases, prior to charging as described above a discharge may be performed on the cells of hybrid battery pack by a discharging sub-system of a hybrid battery cell rebalancer. During discharging, the discharging sub-system may drain the voltage of the battery pack to a voltage level that is significantly lower than a low-point of the vehicle's normal operating discharge cycle. That is to say, the vehicle's own voltage monitor system would stop discharge at a predetermined level. The discharger disclosed will discharge to a voltage level lower than allowed by the vehicle voltage detection system. This may restore lost capacity and further improve the benefit of the hybrid vehicle battery cell rebalancer. After the discharging is complete, the battery may be charged again as described above to complete the cell rebalancing process. In addition, if time is available, the cycle of deep discharge and overcharge can be repeated successively to rebuild the structure of the cells.

In some cases, the charging sub-system may be configured to charge the battery pack to a voltage greater than the physical maximum peak battery capacity (i.e., the maximum peak voltage that the battery pack may be rated to deliver in a fully charged state). As an example, the 1999-2003 Prius has a physical peak capacity of approx. 330 volts, so the charging sub-system may be configured to deliver a peak voltage of a higher amount, for example 340 or 350 volts. Thus, in some cases, the charging sub-system may be configured to deliver a voltage that is greater than 100% (e.g., 101, 102, 103, 105, 106, 107, 108, 109, 110, 111, 112, 113, 114, 115% or more) of the battery pack's physical peak capacity.

In some cases, charging amperage (current) may be constant during the charging process. The amperage may be limited to 1.5 A or less, perhaps 0.75 A, 0.5 A, 0.35 A, or 0.1 A. Amperage may be at a low enough rate that the battery cells may not be damaged by the charging/rebalancing process.

The discharging sub-system may be configured to discharge the entire vehicle hybrid battery pack over a voltage range of 1.45V/cell to 0V/cell. In some cases, current during discharging may be varied based upon the voltage level of the hybrid vehicle battery pack. While the battery is above the normal operating minimum voltage, a higher amperage load (draw) may not be damaging to the battery and can be used to expedite the discharge process. For example, during this phase (i.e., when the battery pack's voltage is above a minimum operating value) the amperage may be 5 A, 4 A, 3 A, 2 A, or 1.5 A. As the battery reaches the normal operating minimum voltage (for example 202V for the 2004-2009 Toyota Prius, or 1.2V per cell) the load (draw) should be decreased. In some cases, when a voltage threshold is reached, the discharge sub-system may switch from constant current to constant voltage and vary the current load/draw to different levels at different predetermine voltage thresholds are reached At this point the discharge sub-system may switch back to constant current until a further predetermine voltage threshold is reached. This may be repeated several times during the discharge sub-systems process. This may be done to allow more work to be performed by the NiMH cells (rebalancing/restoring more cell performance) and to prevent against cell damage such as polarity reversal of individual cells. Amperage load during discharge below the normal operating minimum of around 1.2V per cell may taper proportionally to battery voltage. For example, at 1.0V/cell, the discharge load may be 1 A, 0.7 A, or 0.5 A. At 0.75V/cell, load might be 0.8 A, 0.6 A, or 0.4 A. At 0.4V/cell, load might be 0.4 A, 0.35 A, or 0.15 A and so on. The variable discharge load may be linear, constantly changing with battery voltage, or non-linear with pre-programmed voltage thresholds in which the load decreases based on a pre-programmed algorithm. Linear discharge is preferred, so the system provides for switching in of different fixed discharge loads (resistances). This would create a stair step discharge rate, so additional circuits switch in variable loads between the fixed loads, to approximate linear discharge slope, or at least a series of small stair step increments in load. Discharge may occur to a level lower than normal battery cell operation, such as 1.2V, 1.0V, 0.8V, 0.5V, or 0.0V per cell. Discharge of the hybrid battery may occur in a single session or multiple sessions, such as discharging to 120V in session 1, 100V in session 2, 75V in session 3, and 50V in session 4. A charge & balance session may be performed between each discharge session.

The cooling fan control sub-system may be configured to power and control the vehicle's factory-installed hybrid battery cooling fan. During normal vehicle operations, a hybrid vehicle's hybrid battery cooling fan is typically powered by an auxiliary 12 volt electrical system integral to the vehicle. For example, Toyota and Lexus hybrid vehicle's hybrid battery cooling fans are variable speed controlled by a 12V PWM (pulse-width modulation) signal provided by the vehicle's computer systems. The cooling fan control sub-system of the hybrid battery rebalancer may be configured to tap into the battery fan circuit, and may include a relay to allow normal vehicle function while the vehicle is powered on and being driven, so that the vehicle can provide its own power source and control signals to the cooling system/fan. When the vehicle is parked and the rebalancing of the hybrid battery pack is in process, the relay may allow the hybrid battery cell rebalancer to control the vehicle's factory installed hybrid battery fan using the rebalancer's own 12V power supply and own PWM signal.

The disclosure includes a system for rebalancing and restoring the capacity of a rechargeable battery. Reblancing includes the process of restoring each individual cell of the battery to maximize its capacity. This is accomplished in part by deep discharge below the voltage level which the vehicle in which it is installed would consider the cell/battery to be dead and charging beyond the maximum manufacture's rated voltage for the battery or cell.

The battery charging system may include any or all of the following elements or steps:

a. a first charging routine for charging the battery increasing toward a voltage above the normal maximum manufacture rated operating voltage rating for the battery. This routine may be software or hardware driven;

b. a battery temperature monitoring system for measuring and monitoring the temperature of the battery and for producing an output signal proportional to battery temperature. The temperature monitor may have its own sensors or use the vehicle's temp sensor but redirected for this purpose;
c. a cooling system, responsive to said temperature monitoring system for cooling said battery in response to said output signal; wherein the amount of cooling is dynamically adapted to said proportional signal. The cooling system will preferably increase its output as the sensor indicates rising temperature;
d. simultaneously monitoring the battery voltage and temperature during charging and terminating charging if, once the battery voltage reaches said maximum voltage and then drops, while the battery temperature increases. The dropping of voltage after reaching the manufactures's specified max voltage is an indication that the battery is getting to hot despite the cooling system. The charging needs to be stopped or suspended when this voltage drop is detected.

The system may include a battery discharging system or the discharging system may be a stand-alone element including any or all of the following elements or steps:
a. a plurality of parallel fixed resistive loads switchable between in-circuit and out of circuit with the battery. A fixed resistive load or dummy load does not change its resistance;
b. a circuit having a variable load in parallel with said plurality of resistive loads. The variable load circuit is in parallel with the fixed loads so that it can come into play between the addition (or subtraction) of fixed loads in order to smooth out the stair step load effect of the sequential switching of fixed loads;
c. a first controller for switching in or out of circuit at least one resistive load to discharge the battery and to switch in circuit or out of circuit additional resistive loads to alter the discharge rate according to a predetermined discharge rate schedule. In this scenario, different discharge rates are achieved by the system switching in more/less loads. In the preferred embodiments, the loads will be switched into maximize discharge but subject to maintaining battery temperature within allowed parameters;
d. a second controller controlling said variable load, and adjusting the variable load to increase the load to gradually increase the load between the addition of resistive loads, thereby applying a gradual increase in loads between step wise increase from switching in successive resistive loads. The variable load is preferably activated at the addition or subtraction of a variable load so that it first simulates the state (carries the load) just before a fixed load is switched in or out and then gradually changes the load roughly to the level of the next fixed load insertion/deletion, whereupon the variable load changes its load factor until it approaches the threshold of the next fixed load, at which time the fixed load replaces the variable load and the current load/sink vs. time follows a relatively linear progression rather than stair step;
e. a third controller for controlling said variable load, and adjusting the variable load to decrease the combined load of variable when a fixed resistive loads is removed from the circuit by said first controller when to gradually decrease the load between the removal of resistive loads, thereby applying a gradual decrease in loads between step wise decreases in load from switching out successive resistive loads. This is the reverse of the prior step where loads are decreasing.

Also discloses is a system for rebalancing and restoring the capacity of a rechargeable battery comprising:
A. a battery charging system including:
a. a charging routine for charging the battery increasing toward a voltage above the normal maximum manufacture rated operating voltage rating for the battery;
b. a controller for controlling the current flow to the battery from a predetermined rate to a decreasing current rate as the battery approaches said maximum operating voltage;
c. a battery temperature monitoring system for measuring and monitoring the temperature of the battery and for producing an output signal proportional to battery temperature;
d. a cooling system, responsive to said temperature monitoring system for cooling said battery in response to said output signal; wherein the amount of cooling is dynamically adapted to said proportional signal.

Also disclosed is a system of wherein the charging routine terminates charging if after the battery reaches said maximum voltage, the battery voltage drops, and the battery temperature increases at the time the voltage drops. Dropping voltage, assuming no other load changes, is an indication of overheating of the battery.

Also disclosed is a system where the battery charging terminates when the battery voltage reaches a predetermined voltage over said maximum voltage.

Also disclosed is a system of wherein the current flow to the battery is tapered as it approached said voltage maximum.

Also disclosed is a system for rebalancing and restoring the capacity of a rechargeable battery installed in a vehicle and having an installed cooling device; comprising any or all of the following:
a. a cooling device capable of cooling the battery;
b. a circuit for discharging the battery at a first current rate until a first voltage threshold is reached;
c. a circuit for discharging the battery at a second current rate until a second voltage threshold is reached;
d. a circuit for charging the battery at a third current rate until a third voltage threshold is reached;
e. a circuit for charging the battery at a fourth current rate until a fourth voltage threshold is reached; said fourth voltage being greater than the maximum rated voltage of the battery;
f. a cooling circuit for connecting a cooling device the cooling device to be powered from the rebalancer and removed from electrical connection with the vehicle; said cooling circuit being configured to gradually increase current flow to the cooling device at initiation of cooling;
g. at completion of charging said cooling circuit restoring the connection between the vehicle and cooling device and removing the connection between the cooling circuit and the cooling device.

Also disclosed is a system wherein said current rates are fixed rates.

Also disclosed is a system wherein said current rates are variable rates which change over time. Also disclosed is a system wherein said circuits for discharging include fix and variable circuits for varying the rate of discharge.

Also disclosed is a system wherein said circuits for discharging discharge the battery to a voltage below the voltage preset by the vehicle as an indication of a fully discharged battery.

BRIEF DESCRIPTION OF DRAWINGS/IMAGES

Figure 2:
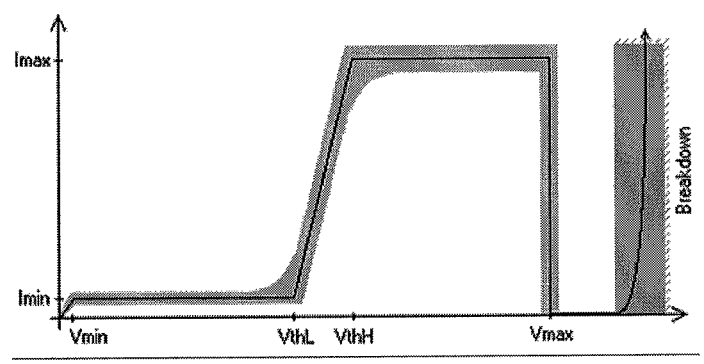
Figure 3:
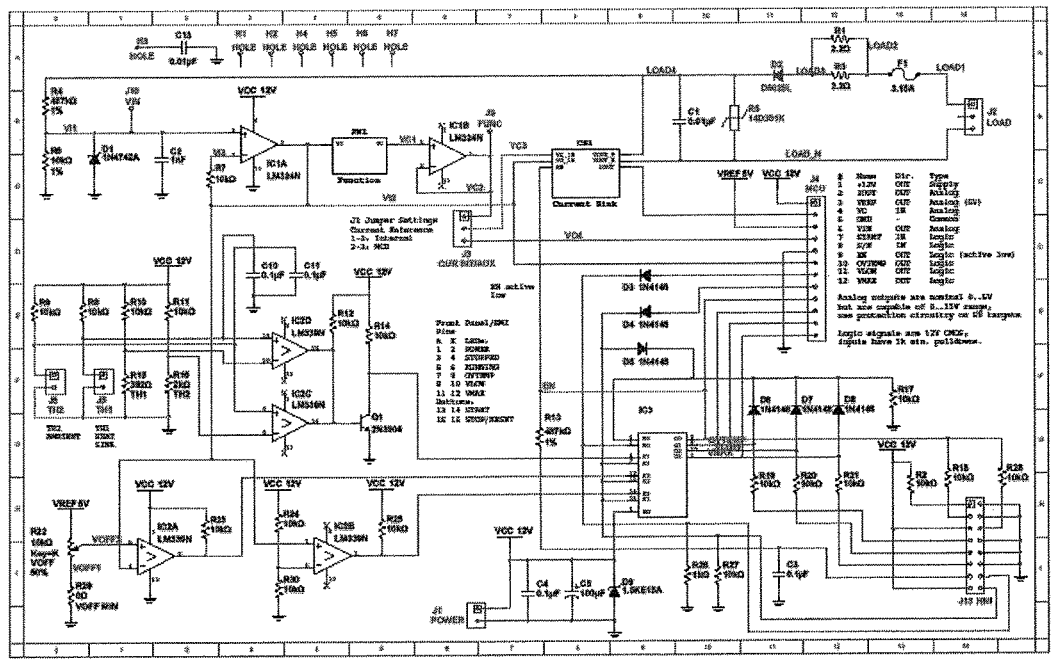
Figure 5:
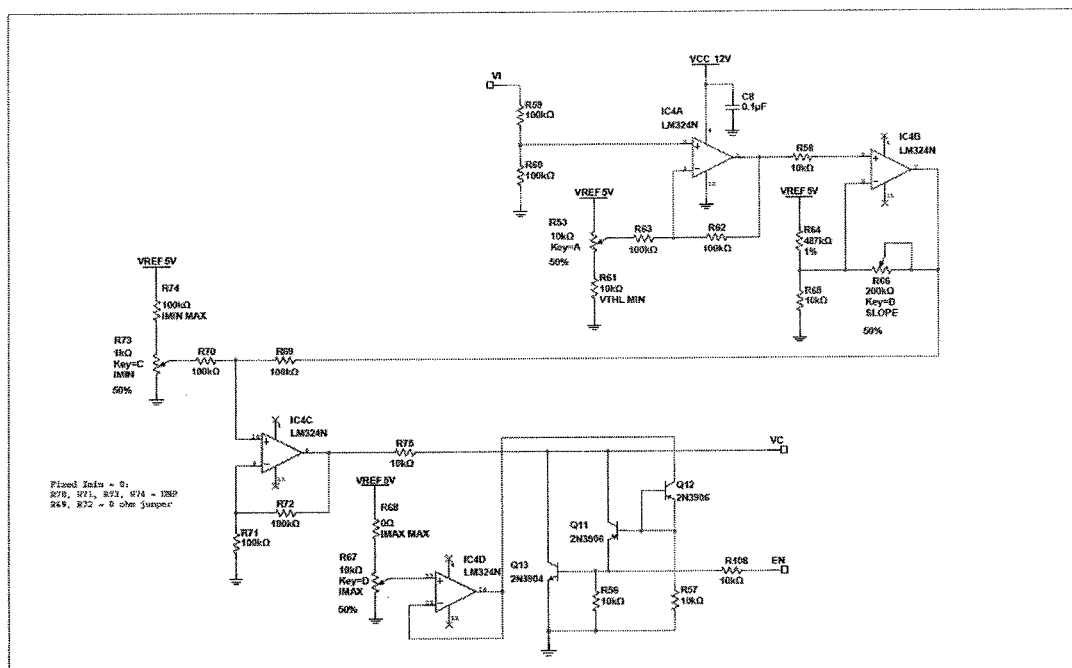
Figure 6:
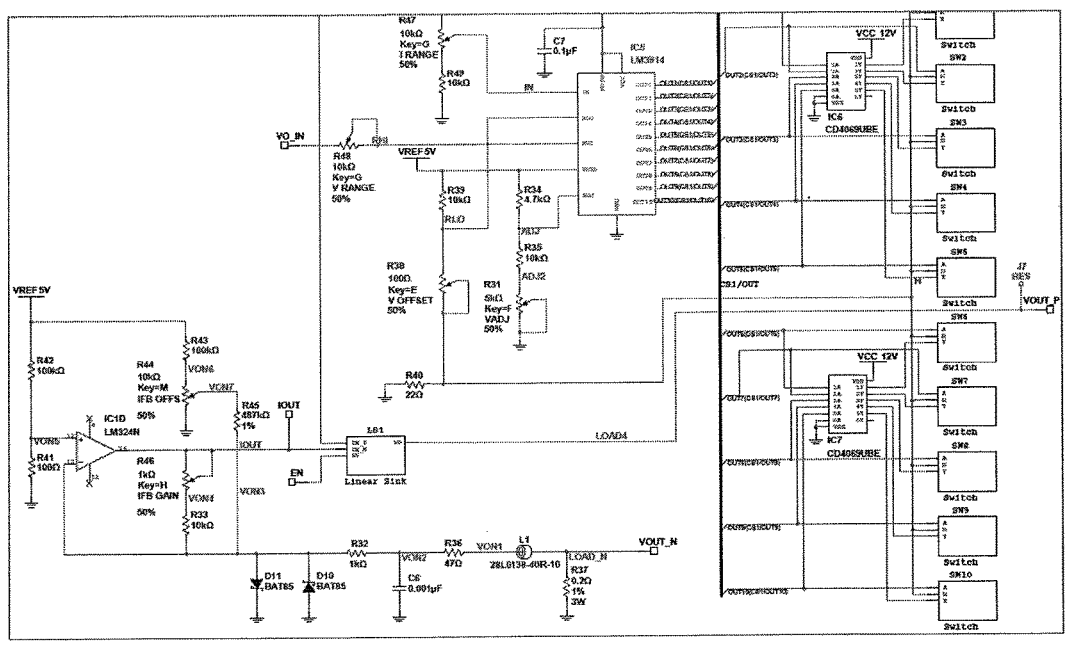
Figure 7:
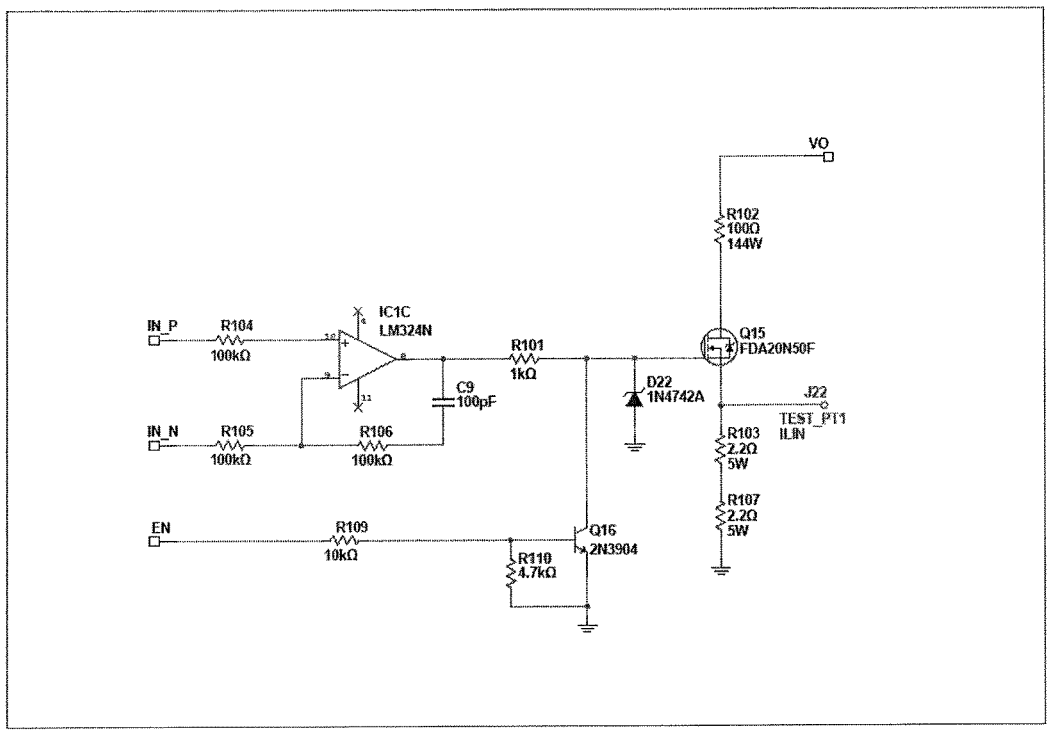
Figure 8:
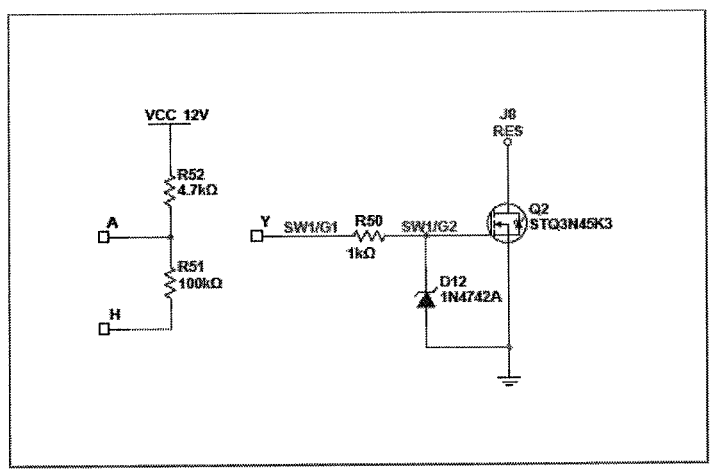
Figure 10:
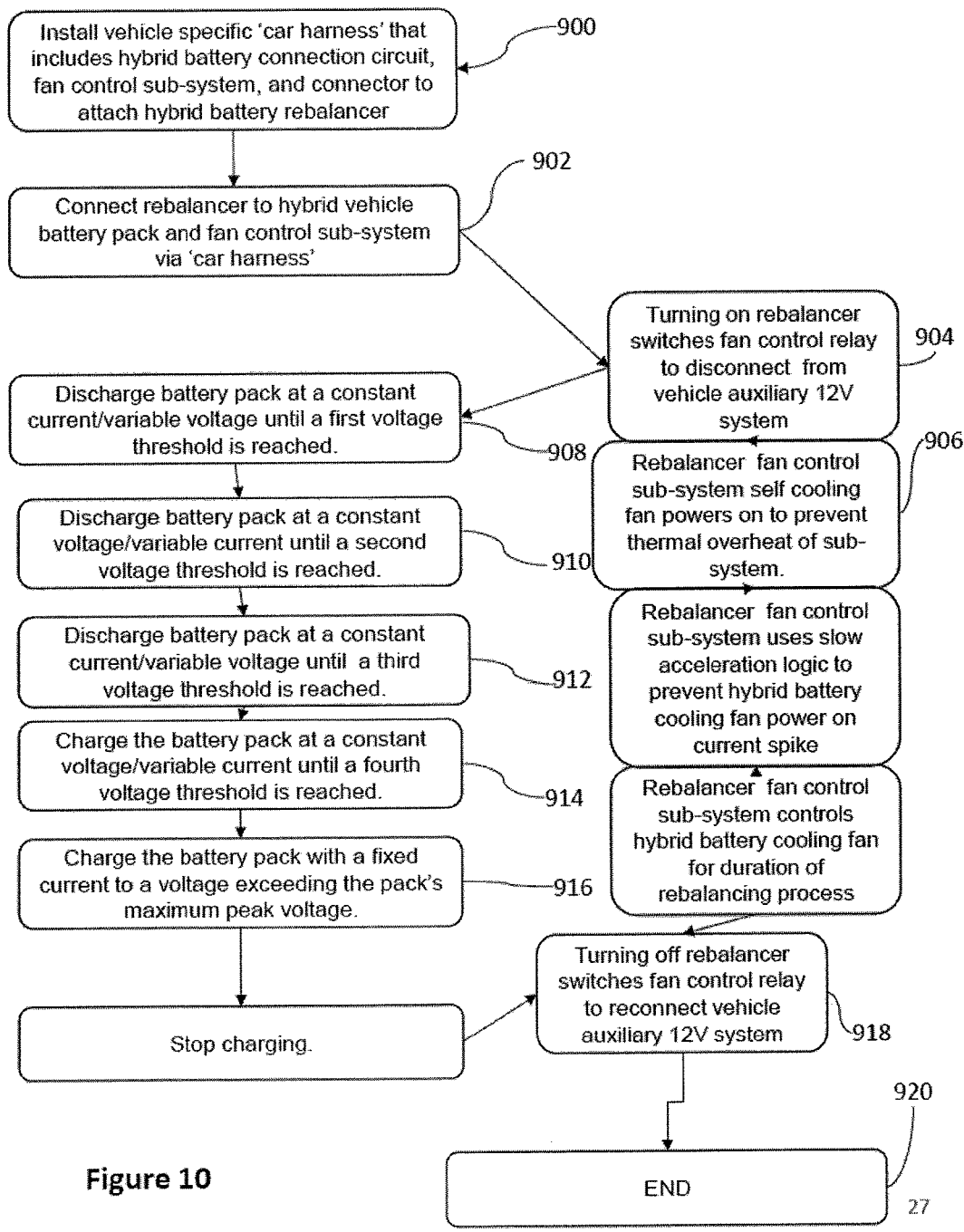
Figure 11:
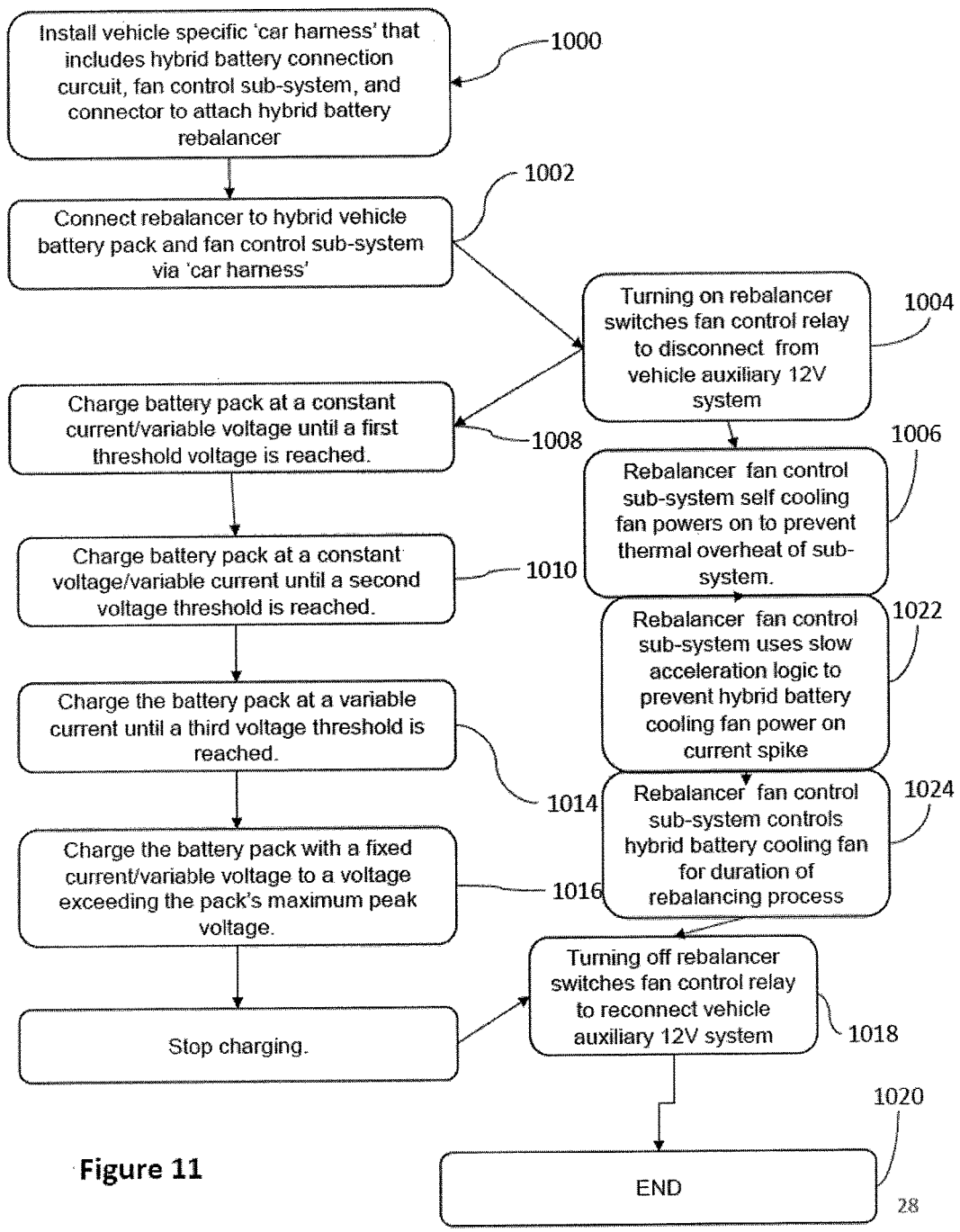
Figure 12:
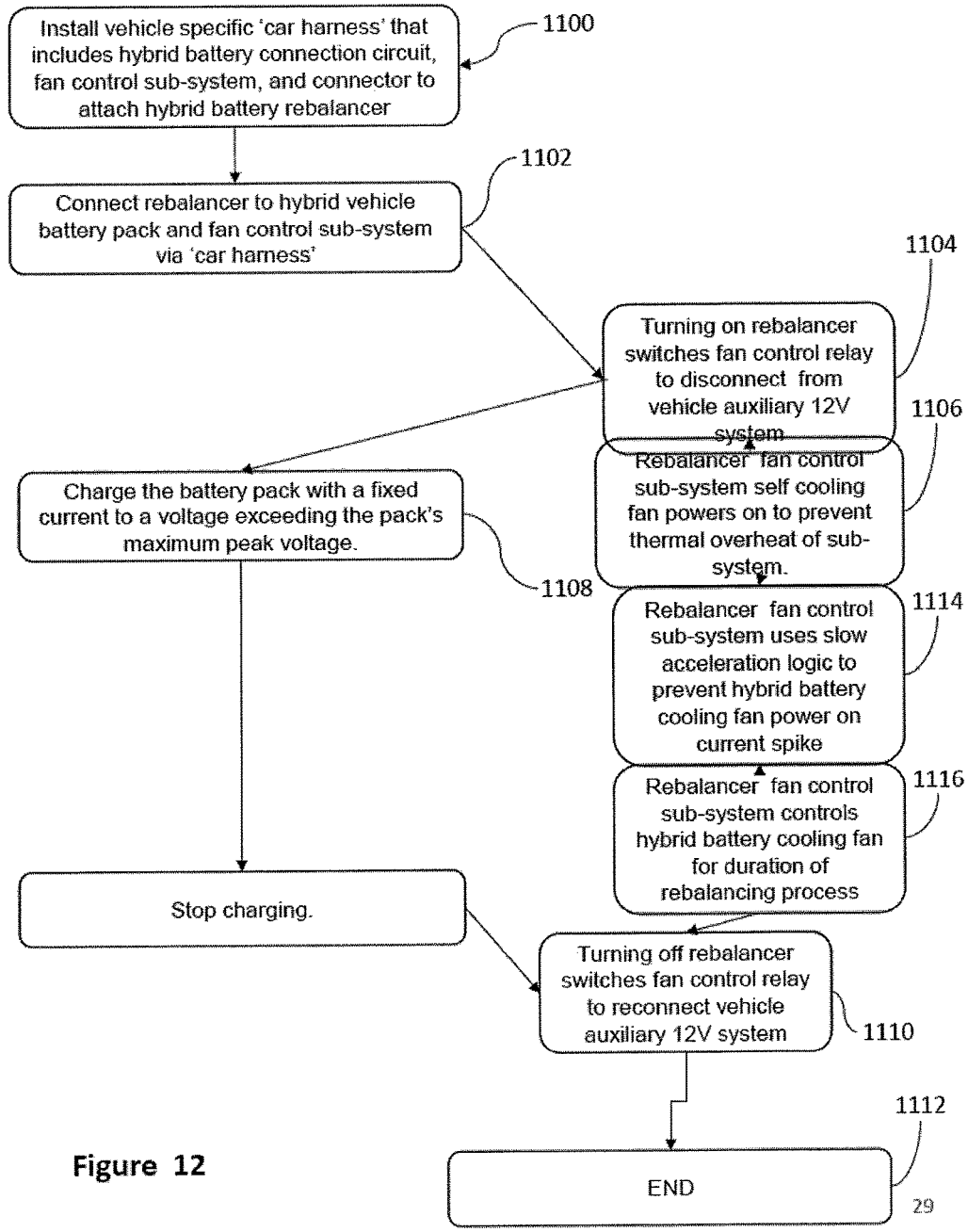
Figure 13:
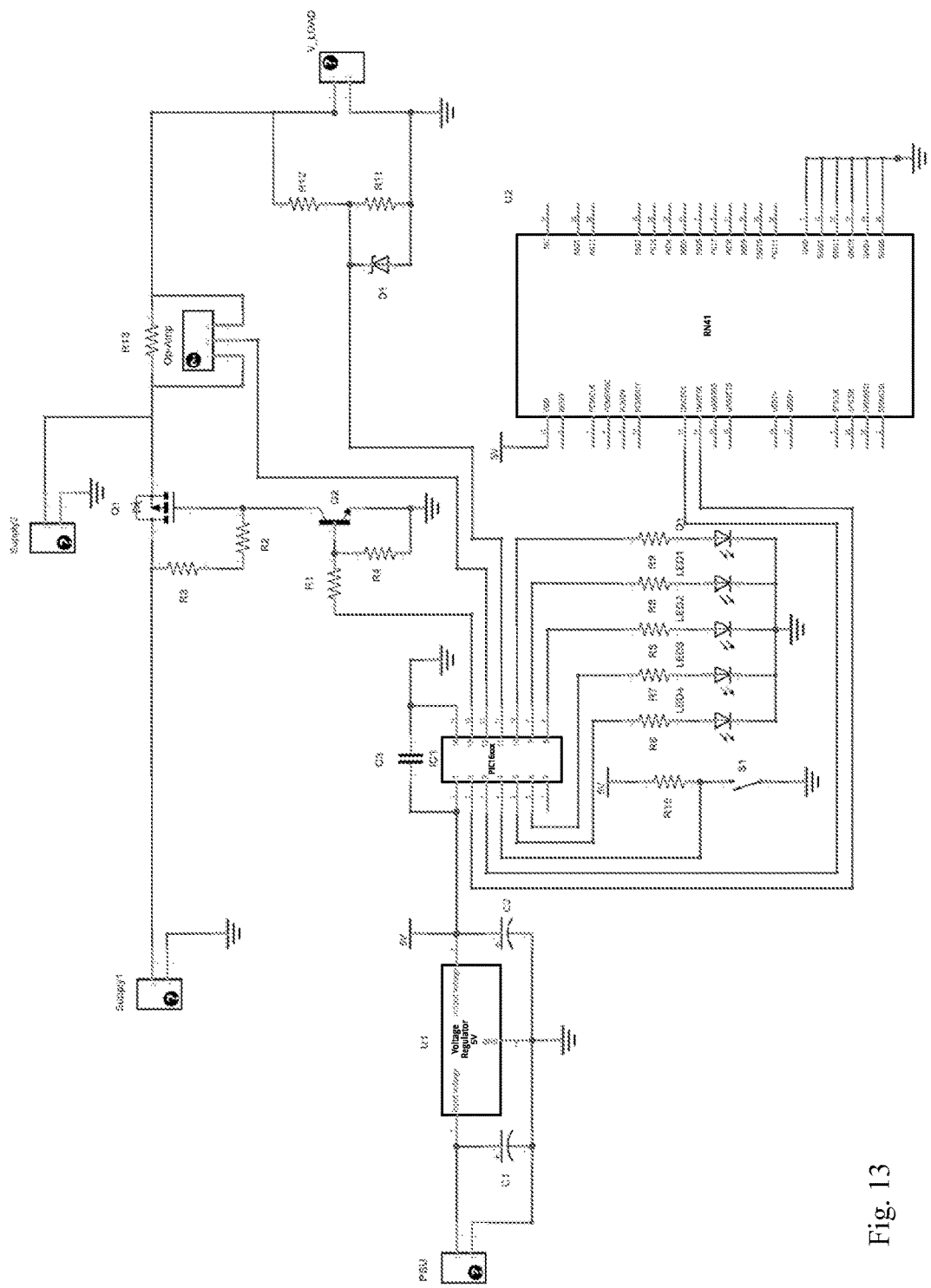
Figure 14:
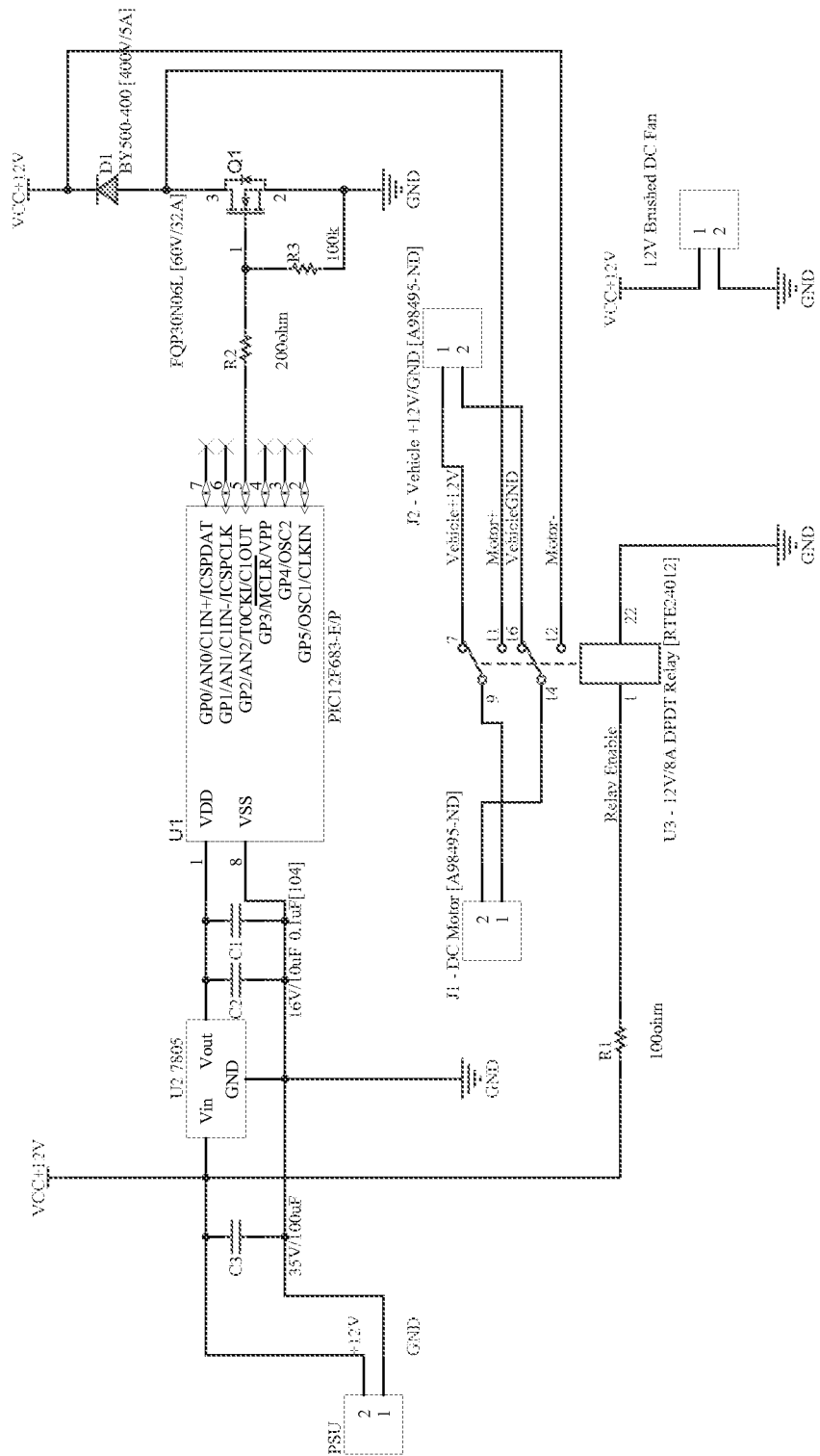
Figure 15:
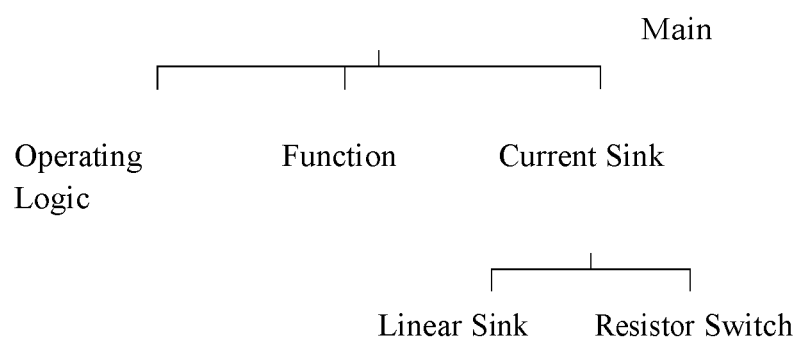

FIG. 1 is a prior art discharge circuit.
FIG. 2 is a discharge curve diagram.
FIG. 3 is a discharger circuit embodiment.
FIG. 4 is a table of module pin outs.
FIG. 5 is a discharging circuit.
FIG. 6 is a current sink portion of a discharging circuit.
FIG. 7 is a portion of a discharging circuit.
FIG. 8 is a portion of a discharging circuit with a resistor switch.
FIGS. 9a-c are charts indicating current flows through the linear sink in FIG. 7.
FIG. 10 is a process flow diagram illustrating a method of rebalancing a hybrid battery pack using a variable discharge then variable charge methodology.
FIG. 11 is a process flow diagram illustrating a method of rebalancing a hybrid battery pack using a variable charge methodology.
FIG. 12 is a process flow diagram illustrating a method of rebalancing a hybrid battery pack using a fixed charge methodology.
FIG. 13 is a variable rate charging circuit.
FIG. 14 is a cooling fan subsystem circuit.
FIG. 15 is a flow diagram illustrating the blocks connected in the hierarchy of the system structure.

DETAILED DESCRIPTION

To improve the restoration of individual cells within a rechargeable battery it is preferred to dynamically control the charging and discharging rates to increase speed and still minimize damaging heat. It is also highly desirable to create an intelligent process which will monitor reconditioning performance to maximize progress.

The present disclosure overcomes the problems mentioned herein.

In one embodiment, the temperature of the battery or cells is monitored, either with a sensor, or by tapping into existing sensors already installed in the vehicle. Then the charging and discharging rates are dynamically adapted to maximize charge/discharge rates and to dynamically control the speed of a cooling fan to provide greater cooling while rates are higher and less cooling during tapering phases.

The temperature of the battery can also be inferentially determined by the change voltage of the battery or cells or by current flow. A fast increase in battery temperature means that substantial current must flowing in/out of the battery and from lookup tables based on prior experience, the temperature of the battery can be extrapolated. For example a voltage increase/decrease of 10v or higher over a predetermined period of time is going to produce more heat than a 5v increase/decrease over the same period.

Various embodiments of a battery (referred to as "hybrid battery", whether hybrid or not) cell rebalancer may be configured in several different ways. For example, some embodiments of a hybrid battery cell rebalancer may include a fixed current charger that does not vary current regardless of voltage. Alternatively, a hybrid battery rebalancer may include a variable current charger that operates at a higher current level when the hybrid battery cells are within their normal operating range, and then tapers the current to a lower level just before rebalancing begins or ends. Various embodiments of a hybrid battery rebalancer may or may not include intelligent control. In some cases, intelligent control may include wireless Bluetooth, WiFi or other wireless connectivity (such as shown in FIG. 14 RN41) to a computer or other network-connected device with a software application configured to control the functionality of the rebalancer. Various embodiments of a rebalancer may be configured with or without a voltage display and with or without an amperage display.

Various embodiments of a hybrid vehicle battery cell rebalancer may include a charging sub-system, a discharging sub-system, and/or a cooling fan control sub-system. In some embodiments, a rebalancer may include a charging sub-system and a discharging sub-system within a common physical enclosure. In other embodiments, each of the sub-systems may be provided in separate physical enclosures. In some cases, each sub-system may be configured to operate independently of the other sub-systems. Alternatively, each of the charging sub-system, dis-charging sub-system, and cooling fan control subsystem may be controlled by a common controller operating each of the subsystems in concert with one another.

The hybrid battery cell rebalancer charge and discharge capabilities can be integrated into a single physical hardware enclosure. The hybrid battery cell rebalancer charge and discharge capabilities can be bifurcated into two physical enclosure sub-components of the same product.

The hybrid battery cell rebalancer can be built with off-the-shelf power supplies and enclosure hardware; it can be built with custom designed hardware components, including but not limited to power supply configuration, hybrid battery cooling fan control, wireless control, and more.

Various embodiments of hybrid battery cell rebalancers may supply power to and control the vehicle's factory installed hybrid battery cooling fan via a 12V power supply (FIG. 14), custom designed circuit board with relay isolation and PWM speed control.

Various embodiments of hybrid battery cell rebalancers may have a vehicle specific car harness to allow the charger to electrically connect with the hybrid battery and control the vehicle's hybrid battery cooling fan without requiring the hybrid battery compartment to be opened for each rebalancing session (FIG. 6). The hybrid battery compartment only needs to be opened once, for the installation of the car harness itself.

The hybrid battery cell rebalancer may be configured with or without a voltage display. A voltage display allows the user to view the current hybrid vehicle battery voltage and monitor the rebalancing process. The hybrid battery cell rebalancer may be configured with our without an amperage display. An amperage display allows the user to view the current amperage being delivered to the hybrid vehicle battery pack and monitor the rebalancing process.

The hybrid battery cell rebalancer may be configured as a fixed current charger that never varies current regardless of voltage (FIG. 12). NiMH batteries normally operate in a range of 1.2-1.4 volts per cell. When cell voltage is within the normal operating range, the amperage used to charge the battery is non-critical. When charging cell voltages are above 1.4V/cell, the amperage is very important. If the amperage is too high cell damage may result. This embodiment would have low fixed amperage regardless of battery voltage, such as 0.15 A, 0.35 A, 0.5 A, 1 A, or 1.5 A.

The hybrid battery cell rebalancer may be configured as a variable charger that operates at a higher current level in the normal battery cell operating range then tapers current just before rebalancing begins (FIGS. 10,11). NiMH batteries normally operate in a range of 1.2-1.4 V per cell CCV. When cell voltage is within the normal operating range, the amperage used to charge the battery is non-critical. When charging cell voltages are above 1.4V/cell, the amperage is very important so in the preferred embodiment, current is tapered as voltage reaches or exceeds the rated max voltage for the cell. If the amperage is too high cell damage may result. This embodiment would have higher amperage when charging the battery in the normal operating range, such as 2 A, 3 A, 5 A or 10 A. The unit may taper to a lower amperage at top of or over the normal operating range of the cells, or approx. 1.35V/cell to 1.4V/cell, reducing amperage to a level such as 0.15 A, 0.35 A, 0.5 A, 1 A, or 1.5 A. The system can be configured to elect either constant current or constant voltage modes controlled by the software or user. When this embodiment of the hybrid battery rebalancer is powered on, it may be in standby mode waiting for user input. There may be three or more user inputs, for example (1) a push button that allows the user to select which vehicle they are connected to; (2) a 'start' button; or (3) a toggle switch to allow the user to switch between different charge profiles, or 'modes' such as a 'PHEV mode' and/or 'rebalancing mode'. Outputs may be varied and possibly include a voltage meter/display, amperage meter/display, LEDs indication of vehicle selection, LEDs to indicate PHEV vs rebalancing mode, an LED to indicate PHEV charge complete, a 'fault indication' LED, and Tx/Rx data logging expansion capabilities.

When powered on, the unit may be in standby mode waiting for user input. A vehicle type may be flashing based on most recent vehicle selection by the user. Using the push button, the user may toggle through the vehicle selection until the LED for the desired vehicle is flashing. Then the user may press and hold the push button for 5 seconds to confirm vehicle selection. The user may select PHEV mode or rebalancing mode at any time prior to pressing the start button which may be displayed by the respective LED. Once the user confirms the vehicle type and mode, they may press the 'start' button to begin the charge process.

When the start button is pressed, the unit may test for battery voltage/load (test #1). If a load is detected, the unit may measure voltage of the load to determine whether the load voltage is above or below the taper threshold (test #2). If voltage is below the taper threshold, the unit may begin charging at 3 A CC (constant current). When the taper threshold voltage is reached, the unit may transition to CV (constant voltage) and taper current down while maintaining a steady voltage level. If the hybrid battery rebalancer is in PHEV (plug in electric hybrid vehicle) mode, the unit may taper to 150 mA, then power off. At that point the PHEV charge complete LED may illuminate. If the hybrid battery rebalancer is in rebalancing mode, the unit may taper to 350 mA, then transition to constant current again and continue charge the batteries above 100% of their physical capacity, for a fixed maximum time period in some cases.

If the start test #2 detects voltage above the taper threshold and the unit is in PHEV mode, the PHEV charge complete LED may illuminate and no further action may occur. If hybrid battery rebalancer is in rebalancing mode, the unit may begin charging at 350 mA constant current and charge the batteries above 100% of their physical (voltage) capacity (or manufacturer's battery rated voltage capacity by 1, 2, 5, 10, or other percentage), for a predetermined fixed maximum time period.

If at any time a voltage drop of 5V or greater (or 1, 2, 5, 10% or greater percentage of the battery's previous maximum charge) is detected, the unit may stop all charging and the fault LED may illuminate. A voltage drop in charger mode, with no extra load, in a battery which has otherwise had an increasing or flat voltage for a predetermined period of time may be an indication of battery cell overheating. A voltage drop is defined as substantial if it declines 1, 2, 5, 10 or greater percentage while being charged after a predetermined period of increasing voltage with no other external load having been added. The hybrid battery cooling fan power/control sub-system may be running at all times during the hybrid battery rebalancing process, in some cases even when charging is stopped.

The hybrid battery cell rebalancer may be configured with no intelligent control. This embodiment may power on when AC power is supplied and immediately deliver high voltage fixed or variable current power to charge the vehicle's hybrid battery and 12V power to power the vehicle's hybrid battery cooling fan. The unit may continue to deliver this charge until the AC power cord is disconnected.

The hybrid battery cell rebalancer may be configured with intelligent control such as a power switch or wireless Bluetooth or WiFi connectivity to a software application that controls the functionality of the charger. A power switch can be used to allow the user to turn the hybrid battery rebalancer on or off without having to unplug it. A wireless control interface can be used to allow the user to remotely power the charger on or off via a software application. This software application may be compatible with Apple, Android, Microsoft, and/or other operating systems. The software application may have global connectivity to allow the user to control the hybrid battery rebalancer from any location with Internet and/or Bluetooth connectivity. The software application sub-system may have a power on/power off function. The software application sub-system may have a timer function to turn the charger on at a fixed time or turn it off after a fixed time. The software application sub-system may have a function to calculate how many amp hours of charge are delivered to the battery and turn the charger off after a user set number of amp hours (aH) have been delivered. This may be calculated as aH capacity/charge rate*efficiency factor=# of hours to be charged. For a 6.5 aH battery being charged at 350 mA at 90% efficiency, time required is 20.4 hours (6.5 Ah/350 mA*1.1=20.4). The software application may have a function to calculate how many amp hours of charge are delivered to the battery and turn the charger on and charge such that the battery is charged a specified amount and complete at a specified point in time. For example 3 Ah of charge at 1 A current 85% efficient cells with a 'be done time' of 6:00 AM would require powering on at (3 Ah/1 A*1.15=3.45 hrs.) 2:15 AM. The software may calculate the charging rate, within allowable ranges, to complete rebalancing within the time allowed set by the user. The software application sub-system may have the ability to email the user a reminder to charge the battery at a preset, user defined time interval. The software application sub-system may have the ability to send a text message the user a reminder to charge the battery at a preset, user defined time interval or when the rebalance cycle will be complete. The software can also calculate whether there is sufficient time to complete a rebalance based on user input on when the vehicle must be available for use again. If the time to use is too short, the system will indicate that a full rebalance cannot be achieved and the user has the option to abort the process. The software application sub-system may have the ability to upload data logging files from charge/discharge session to designated server to create long term health profile of vehicles hybrid battery. Data logging files may contain charging and/or discharging amp-hour profiles that may be compared over time to show trends in hybrid battery health. The software application sub-system may allow a user to program a schedule for preset intervals when they want the charger to turn on and off. The software application may track energy usage and provide financial cost analysis to the hybrid battery cell rebalancer user. The hybrid battery cell rebalancer may be configured with custom designed or off-the-shelf hardware components, including but not limited to power supply configuration, hybrid battery cooling fan control, wireless control, and more. Various embodiments of hybrid battery cell rebalancers may have a vehicle specific car harness to allow the charger to electrically connect with the hybrid battery and connect with and control the vehicle's hybrid battery cooling fan. Each hybrid vehicle model has a different physical layout for the hybrid battery location and hybrid battery cooling fan design and location. As a result, a vehicle specific car harness may be designed and built for each model that the hybrid battery rebalancer may be used with. The hybrid battery rebalancer itself may be of a consistent design, regardless of which hybrid vehicle model it is being used on.

Various embodiments of hybrid battery cell rebalancers may supply power to and control of the vehicle's factory installed hybrid battery cooling fan via a 12V power supply and custom designed circuit board with relay isolation & PWM speed control. During normal vehicle operations the hybrid battery cooling fan is typically powered by the vehicle's 12V auxiliary electrical system.

The hybrid battery cooling fan control sub-system may be comprised of five main elements. These elements may include the main control unit, drive unit, relay switch, voltage regulation unit, and cooling unit. Cooling is important to allow more rapid charging and discharging without damage to the battery.

The main control unit may utilize a PIC12F683 (FIG. 14, U1) microcontroller to provides the appropriate PWM (Pulse Width Modulation) signals used to support the motor drive circuit of the system. In addition, the PIC12F683 MCU may provide for a soft-start ramp up of the hybrid battery cooling fan motor via a software algorithm, providing a smooth turn-on of the motor to avoid any excessive current surges during initial turn-on of the system. A soft ramp up is defined as a gradual increase in the power applied to the cooling system rather than an abrupt full power start. For example, a gradual increase of power could be in step increments 5%, 10% or 25% until full power is reached. Excessive current surges could potentially trigger an automatic shutoff of the power supply that supply power to the PCB and/or damage any critical components on the board.

The drive unit may be comprised of a MOSFET (metal oxide semi-conductor field effect transistor) FIG. 14—Q1, heat sink, free-wheeling diode, FIG. 14 D1, and gate drive resistors, FIG. 14, R2, R3. The PIC12F683 may provide a predetermined pulse width modulated signal to drive the MOSFET via the gate drive resistors. The gate drive resistors help bias the amount of voltage to turn on/off the MOSFET. The gate resistor, FIG. 14 R3, may be used to ground any signals during a floating state condition that the PWM output pin may encounter during startup. This avoids any conditions (i.e., the transition when the PWM pin switches from an input to output) that may inadvertently turn-on the MOSFET, particularly during start-up. The heat sink may be used to help dissipate heat that is generated by the MOSFET. The free-wheeling diode (FIG. 14—D1) may be used to bypass any excess current (that may have the potential to destroy the MOSFET) that is induced when the fan motor is being turn off.

The relay switch (FIG. 14—U3) may enable the PCB to select between two control lines that will drive the vehicle's internal hybrid battery cooling fan. One control line may be driven by the vehicle's 12v auxiliary system. The other may be directly driven by the PCB. During normal operation (PCB is not powered up or engaged), the vehicle's 12v auxiliary system will full control of the fan. When the vehicle is powered off and the hybrid battery rebalancer connected and powered on, the relay allows for the PCB to drive the fan, isolating the control lines from the vehicles 12v auxiliary system. The PCB will only be activated when the power supply supplies power to pin 1 of the relay. The voltage regulation circuit may be used to provide a clean 5V power rail to power up the main control unit (PIC12F683). A 7805 (FIG. 14—U2) linear voltage regulator is used to step down the input power supply voltage from ~13.5V and regulate it to ~5V. The FIG. 14—C3 & FIG. 14—C2 capacitors are used to buffer the input and output voltage to and from the 7805 voltage regulator, allowing the system to recover from a momentary drop in line voltage, which could cause a power shut down. FIG. 14—C1 is used as a decoupling capacitor for the power supply for the PIC12F683. This capacitor is used to remove any high frequency noise and to avoid any power fluctuations that may affect the PIC12F683.

The cooling system may comprise a 12 VDC brushed DC fan motor. The 12 VDC brushed DC fan motor may be used primarily to keep enclosure temperatures within an allowable range. The DC fan motor may be directly wired to the input power supply voltage ~13.5V of the PCB, which may be activated as soon as power is applied to the PCB.

Rebalancing of the hybrid battery pack may be performed when the vehicle is parked and powered off. The external 12V power supply contained in the hybrid battery rebalancer may power the relay and isolate the hybrid battery fan circuit from the rest of the car's electrical system. The external power supply provides an important function, since the vehicle's 12V auxiliary battery may be very small in capacity, and attempting to power the hybrid battery cooling fan with the vehicle's 12V auxiliary battery with the vehicle off could quickly drain the 12V battery to a point where the car would not be operational. The hybrid battery rebalancer isolates the vehicle's 12V auxiliary battery intentionally, such as by relay, to preserve its charge and ensure the vehicle functions properly at the conclusion of the hybrid battery cell rebalancing process.

FIG. 10 provides a process flow diagram illustrating an example of a method of rebalancing a hybrid battery pack using a rebalancer with any or all of the steps/features as described above. The process 900 may include the steps of installing vehicle specific 'car harness' that includes the hybrid battery connection circuit, and fan control sub-system in a vehicle 902, connecting a rebalancer to the hybrid vehicle 'car harness' 904, activating relay that disconnects hybrid battery cooling fan from vehicles 12V auxiliary power and enables rebalancer to provide power to and control the vehicles hybrid battery cooling fan 908, discharging the hybrid vehicle battery pack at a constant current until a first voltage threshold is reached 910, discharging the battery pack at a constant voltage until a second voltage threshold is reached 912, discharging the hybrid vehicle battery pack at a constant current until a third voltage threshold is reached 914, discharging the battery pack at a constant voltage until a fourth voltage threshold is reached 916, charge the battery pack with a fixed current to a voltage exceeding the pack's maximum peak voltage 918, stop charging by turning off the rebalancer. This also switches fan control relay to its resting position which reconnects vehicle auxiliary 12V system. 920 ends the process.

In some cases, immediately prior to discharging and/or charging the battery pack 908 a fan control relay may be switched to disconnect the vehicle's auxiliary power supply system 904. The cooling fan may be operated and controlled 906 by the cooling fan control sub-system while the battery pack is discharged and/or charged 908-916. The cooling fan may be stopped 918 when the charging is complete.

The fan control sub-system connects to the vehicle as shown in FIG. 14. A splice is made in the vehicle's hybrid battery cooling fan power circuit and terminals are installed on the wire ends. These terminals are connected to the fan control sub-system with screw down connectors. A lid is placed on the enclosure to protect it from contaminates.

FIG. 11 provides a process flow diagram illustrating an example of a method of rebalancing a hybrid battery pack using a rebalancer with features as described above. The process 1000 may include the steps of installing vehicle specific 'car harness' that includes the hybrid battery connection circuit, and fan control sub-system in a vehicle 1002, connecting a rebalancer to the hybrid vehicle 'car harness' 1004, activating relay that disconnects hybrid battery cooling fan from vehicles 12V auxiliary power and enables rebalancer to provide power to and control the vehicles hybrid battery cooling fan 1008, charging the hybrid vehicle battery pack at a constant current until a first voltage threshold is reached 1010, charging the battery pack at a constant voltage until a second voltage threshold is reached 1014, charging the hybrid vehicle battery pack at a constant current until a third voltage threshold is reached 1016, charge the battery pack with a fixed current to a voltage exceeding the pack's maximum peak voltage 1018, stop charging by turning off the rebalancer. This also switches fan control relay to its resting position which reconnects vehicle auxiliary 12V system. 1020 ends the process.

The hybrid battery connection points are direct to the hybrid battery system. This connection is direct to the battery; no vehicle electronics such as relays are in between the battery balancer and hybrid battery. The battery balancer may have either a diode or fuse for fault protection of the 'car harness.'

The car may be turned off while rebalancing the hybrid battery. The first phase of rebalancing may be 'filling' the battery. When the rebalancing process begins (FIG. 11-02), the hybrid battery may be anywhere from 20%-80% charged, depending on vehicle model and how charged the battery was when the car was powered off. Upon powering on the hybrid battery rebalancer, the relay may charge, change position, and isolate the vehicles auxiliary 12V power system. It may then allow the hybrid battery fan control sub-system to provide power to and control of the vehicles hybrid battery cooling fan (FIG. 11-04). The battery may be discharged before being charged as shown in FIG. 9. During the 'filling' phase (FIGS. 11-08 to 11-16) the voltage will climb at either a variable or steady rate from the starting voltage up to the physical maximum capacity of the hybrid battery pack. The max voltage of the battery may vary depending on vehicle model, the hybrid battery's overall condition, ambient temperatures, and may change from rebalance session to session. It may take anywhere from four to twenty hours for filling to complete, depending on the rebalancer iteration and how low the battery is when starting the process. Once the battery cells begin to reach their maximum physical capacity, the rebalancing process begins. (Note: no 'balancing' occurs during this 'filling' phase.) During the 'balancing' phase the voltage will level off and become a steady voltage reading or a slow oscillation of voltage—perhaps a 1-3 Volt range. This means the battery is currently in the balancing phase. The initial balancing can take 4-12 hours after the filling phase is complete. Subsequent balancing sessions are often much shorter, perhaps 4-6, or 10 hours after filling is complete. As any given cell reaches its maximum physical capacity, the cell converts the charge energy to heat, the cell voltage drops slightly as the cell dissipates the heat, then recovers and again charges back to 100%, repeating this process over and over. This is one way the system can detect rebalancing, i.e., monitoring voltage and heat correlation. Voltage dropping while heat is increasing as measured from the heat and voltage sensors. This applies near or at maximum rated battery voltage or within 1, 2, 5, or 10% or greater thereof. If heat is increasing and voltage is dropping after a period of increasing voltage due to charging or substantially flat voltage as charging is tapering to max, then it may be an indication that charging is complete or the battery is not cooling sufficiently (such as because of high ambient temperatures in summer). In either case, charging should stop until a lower temp is detected or it is presumed that charging/rebalancing is complete. As the cells undergo this cycle the lower voltage cells continue to fill and 'catch up' to the cells that have already reached 100% charge level. The balancing process is complete when the last of the individual hybrid battery cells reaches a true 100% state of charge. Once the voltage no longer fluctuates, and/or the desired amount of time has elapsed, the charging and balancing process is complete. At this point the rebalancer may be powered off. When power is removed from the hybrid battery cooling fan sub-system, the relay returns to its default position and returns control of the hybrid battery cooling fan to the vehicle.

The following disclosure provides further detail on the system, apparatus, method and circuitry.

The simplest way to discharge a battery would be a resistor, such as an incandescent lamp or other high current device. However, different values are required for different battery voltages, and the current does not remain constant as the battery discharges. Also, as a battery be-comes fully depleted, the voltage drop across individual cells starts falling sharply, and can even reverse, causing damage. To minimize this risk, the discharge current is preferably dynamically controlled and should be reduced along a curve (FIG. 2) Discharger V-I curve shown in FIG. 2 is not to scale. Gray areas are tolerances and adjustment range The gray region marked "breakdown" is the fault region (likely to blow the fuse). FIG. 3 illustrates a discharger circuit. Instead of a single resistor, an array of resistors could be switched to control the current. The number of resistors could then be controlled to roughly regulate output current. Alternately, a solid state controlled current sink could be used, but dissipating hundreds of watts in transistors would be expensive. Either way, this produces a stair step current trace.

In the preferred embodiment, the load, such as a resistive dummy load, is adjusted to discharge the batteries at roughly 2.5 amp/hr meaning a full discharge for a typical Toyota® Prius® battery will take 4-8 hr. to fully discharge. The preferred combination of ballast load is wirewound resistors (such as 50 w resistors) which can be switched in and out and also by adding solid state (f. ex FET bridge on a large heat sink) discharge circuits. These solid state current sinks essentially fill in the stair steps to create a smoother more linear discharge path, so that the plot of discharge current vs time is more or less linear and not stair step, which would result from switching in/out only fixed resistor loads.

In particular, as the battery reaches full charge or discharge, the process is tapered down, such as to 350 ma. A preferred target discharge voltage is 0.4-0.8 v which is taken as full discharge but not so low that the polarity may reverse.

It is also preferable to calibrate the charge/discharge system by knowing/inputting the number of cells and the normal full charge voltage produced by such cells (different metals produce different voltages) into a data table to be used by control software or manually. Different vehicles/electric devices have different load ranges which should also be taken into account in calibration.

The present disclosure combines the best of both, i.e., inexpensive passive resistive elements with dynamically control by solid state devices. The passive elements can be switched into and out of circuit to create a "stair step" resistance but to smooth the steps, solid state control can add or subtract other dynamic resistance between steps, to approximate a linear resistance vs current pattern. This discharger takes the best of both worlds, using an analog or digital calculation to determine how many discrete resistors to switch in. To achieve high accuracy, a low capacity current sink may be used to fill in the gaps between resistor steps, leading to a good balance between cost, accuracy and reliability. (See FIG. 15).

Load voltage is applied to J2 (region 14-B), fault protection being provided with associated components F1, R1, R3, R5, D2 and C1. This voltage is then routed to the Current Sink module, and the voltage sense circuitry.

The Current Sink module draws a constant current, nominally 0-2.5 A, proportional to the 0-5 V current command signal at its VCi_in input.

The current command, in turn, is generated from a DC transfer function, so that current and voltage are related as in FIG. 3. This is accomplished with the Function module.

The remaining circuitry includes: scaling and buffering the battery voltage (R4, R6, D1, C2, R7, IC1A), providing external access to all relevant signals (MCU connector, J4), and the protection and operating logic (IC2, IC3, the HMI connector, J13)

Safe and automatic operation is implemented. IC3, a quad RS flip-flop, provides the "brains" for the operating and fault states. The first section (pins 2-4) controls the output, through the active-low E N connection. While E N is low, the Current Sink module is active, drawing current as commanded by its VC in input (the VC3 wire connects to either the Function module or the MCU, depending on the jumper setting of J3).

The START and STOP buttons (front panel/HMI connector, J13 pins 13-14, 15-16) provide control over the EN flip-flop, allowing the user to start and stop current flow. The STOP button is level triggered, while the START button is pseudo-edge triggered only (with a one-shot delay time constant of C3 with R26, or 100 µs, and a hold-off time constant of C3 with R13, or 48 ms, minimizing retrigger events due to contact bounce).

Module Pin Descriptions are shown in FIG. 4.

The flip-flop is reset-dominant, so if the STOP button is held while tapping the START button, the circuit will remain off, without producing transients.

IC3's other three flip-flops serve to record which fault, if any, caused the circuit to stop. These are: temperature limit, under-voltage and over-voltage. (Two temperature limits are provided, but they are OR-ed together, so the circuit does not know which one triggered a temp fault.)

Two temperature limits, which provide safe shut down if exceeded, are provided by R8-R12, R14-R16, J5, J6, IC2C, IC2D and Q1. NTC type thermistors on leads connect to J5 and J6; the temperature thresholds can be controlled either by specifying a value of thermistor which measures 10 kΩ at the desired temperature, or by substituting the desired value for R15 and R16. For example, for J5, a 10 k nominal NTC might be chosen, which might measure around 3 k at a desired threshold of 80° C.; R15 would then have to be replaced with 3 k to satisfy these conditions.

The voltage thresholds are provided by R22-R25, R29, R30, IC2A and IC2B. The undervoltage fault is not so much a fault as an intended mode of operation, where the discharge stops at a specified voltage. It is desired to discharge to a voltage below what is normally considered minimum by the vehicle's software. If the setting is nonzero, it also serves as a safety mechanism, so that the circuit defaults to the off state when the battery terminals are open circuit.

The undervoltage threshold is set by R22, Voff. The range of this control is set by the value of R29, the ideal minimum being:

$$V_{off(min)} = 250 \text{ V} \frac{R29}{R22 + R29}.$$

The setpoint can be extrapolated by measuring the voltage on Voff (R22's wiper), multiplying by the voltage gain (ideally, 50).

The overvoltage threshold is fixed as a ratio of the supply voltage, nominally corresponding to 300 V. This fault should only occur when connecting an excessively high-voltage battery to the discharger, or under unusual transient conditions which cause the voltage to spike (examples may include accidental shorting of cables, operating a load also connected to the battery, or attempting to charge the battery). Because this safety threshold is determined by the supply voltage, a fairly narrow range of supply voltages are tolerable.

Although the discharger is preferably designed for 250 V maximum, in this embodiment, it will continue operating safely up to 300V. In this embodiment, for this subject battery, operation above 250V is not recommended, because the load protection circuitry (in particular, the MOV, R5) may draw additional current and create an unsafe condition or premature failure (a marginal increase in voltage could cause R5 to draw enough current to overheat and burn out, without drawing enough current to blow the fuse).

To generate the voltage-to-current profile, a series of amps and limiters approximates the discharge curve with a piecewise linear function. The circuit is shown in FIG. 5. First, an offset voltage is subtracted from the input with R53, R59-R63 and IC4A. This causes the output to saturate negative (for the LM324 in single supply operation, this is under 50 mV) when the input is below $V_{THL}$. In turn, $V_{THL}$ is set by R53, and its range by R61.

The next stage (R58, R64-R66, IC4B) provides gain, so that when the input is above $V_{THL}$, it rises along a slope set by R66. The gain is adjustable from 1 to 25 as shown, so that, if $V_{THL}$ is set to zero, a gain of 1 gives essentially a pass-through function vc=vi. A gain of 25 translates to a steepness such that the load current can go from minimum to maximum over a range of just 10 V at the battery terminals. Maximum gain depends on the total value of R66, so it can be replaced with a different value trimmer (or fixed resistor) for a desired gain or range. (R64 provides a small bias to counteract the saturation voltage of the previous stage, and to over-come offset of the present stage, ensuring that saturation of the preceding stage remains near zero, even at high gain.)

To provide the weak constant discharge current $I_{min}$ at low voltages (under $V_{THL}$) a small voltage is added with R69-R74 and IC4C. $I_{min}$ is set by R73, and its range by R74. The values shown give a range of 0-25 mA.

Finally, to cause positive saturation to a maximum current value $I_{max}$, a clipper circuit (R56, R57, R67, R68, R75, R108, Q11-Q13, IC4D) is used. The maximum voltage is set by R67 (and its range by R68), which is buffered to a low impedance with IC4D. Q12 and R57 subtract one diode drop, using an inverted PNP transistor; this is complemented by Q11, which is also operated in the inverted mode, and acts to pull down the output voltage ||X if it rises one diode drop above Q12 base/emitter (which is one diode drop below the $I_{max}$ voltage). Thus, the diode drops approximately cancel, and the voltage is clamped to $I_{max}$. Because the gain of an inverted 2N3906 is quite low, the "collector" current from Q11 is not tied to the pulldown as a diode (like Q12), but drives another transistor, Q13, which acts to assist Q11 when the source voltage (from IC4C) is more than a few volts above $I_{max}$.

In this embodiment inverted transistors are used. Normal-mode transistors were found to have excessive emitter-base leakage, leading to a sloppy clamp function. In other embodiments, normal mode transistor configurations could be used to soften the stair step curve, but it would be temperature sensitive. The collector-base junction, in contrast, has a high voltage rating and low current leakage, making it suitable for a wide range clamp.

Using this differential transistor pair approach (the cancellation of two diode drops) has better voltage accuracy (0.1 V or better) and less temp coefficient than using just a diode (0.6 V offset, −2 mV/° C. temp. coefficient), and is much faster (responds in tens of nanoseconds) than an active rectifier (which would be practical using IC4D for the purpose, instead of as a buffer). The active rectifier would save a few components (only a diode and a few resistors are required), and would be more accurate (a few mV error), if slow to respond (microseconds). (Note that Q13's purpose is still required, as it clamps vc to ground when EN is high.)

The current sink is shown in FIG. 6. It performs three main functions: calculating how many resistors to switch in, measuring the total current, and (using the Linear Sink module) adjusting total current to match the current command signal.

At its heart, an IC5 (display driver) bar graph display driver (IC5) is used to determine how many resistors should be switched in at any given time. This chip is essentially an analog-to-digital converter, though unlike most with a binary output, its output is a unary 'thermometer code' type. This provides all the computation required to drive the switched resistor array. The voltage conversion range is freely adjustable (start and end points), allowing, in effect, the arithmetic division of two voltages: exactly what is required to calculate the required load resistance, R=V/I. It also has an adjustable bandgap voltage reference, which provides accurate voltage thresholds for the entire system.

The main downside to the IC in this application is, the outputs are active low: well suited for its original purpose of driving LEDs, but not for driving MOSFETs. IC6 and IC7 invert these signals to drive the Resistor Switches.

Since the start and end voltages are adjustable, the IC can be used "in reverse" (i.e., varying the reference voltages rather than the input) to generate an inversely proportional output, i.e., as the 'end' voltage rises, fewer outputs are activated. By driving this from a calibrated fraction of the load voltage, the correct number of resistors can be calculated. The conventional (proportional) input then controls how many resistors out of the total are active, with more being active at low load voltages, or fewer at high voltages, proportional to the current draw demanded.

The scaled, filtered and buffered load voltage comes in from the VVO_in terminal. R48, ☐ Vrange controls the voltage gain, which in turn controls how many resistors are switched in, and how often. Likewise, R47 controls the current gain. R47 and R48 have proportional effects, and are provided more for prototyping purposes than for operational adjustment or calibration.

Both R47 and R48 must be adjusted before operation; incorrect adjustment results in excess current draw (too many resistors switched in; Linear Sink can't draw negative current so current regulation is lost) or destruction (too few resistors switched in, causing the Linear Sink to draw excessive current to compensate). Recommended operation is with R48 fully CCW (full voltage gain) and R47 adjusted to give even current peaks (see Testing).

R38, R39 and R40 implement positive feedback, from the resistor switches to the voltage sense, making more 'crisp' transitions between resistor levels. Normally, the IC 5 has a small proportional range between levels, which is fine for a display (a half-lit LED is meaningful), but potentially dangerous here (though the proportional range is restricted by the gain of the inverters and switching transistors, slow switching, oscillation or linear operation could still result, causing excessive dissipation in the switch transistors). The positive feedback amounts to about 2 mV per step, enough to ensure stable switching between states.

Because the circuit and load are isolated, total load current can be sensed easily with a single shunt resistor, R37, with no worries of the shunt having some unexpected voltage superimposed on it. A maximum current of 2.5 A develops −0.5 V. This is fed into an inverting amplifier, IC1D, which brings the signal up to 5 V full scale range, same as the current command signal. This signal also returns, via the IOUT port, to the top level diagram, where it is made available on the MCU header. This signal is the preferred reference for output setpoint (actual current draw).

The current command and current feedback signals are both routed to the Linear Sink, which, like an op-amp, adjusts its output (in this case, battery current draw) to keep its inputs equal.

The Linear Sink FIG. 7 acts like an op-amp. The reason is apparent; it is. R118 and R119 connect the inputs to the op-amp, and R120 and C9 provide compensation. R115 provides some isolation between the op-amp and transistor, and allows the output to be clamped by R122, R123 and Q16 when E N is high (disabled). D22 pro-vides transient protection. The transistor can be any large power transistor rated over 200 W with a wide SOA; the PETs Q15 were selected for the prototype, having a full SOA, and a good compromise between power handling and cost.

The transistor is operated as a conventional current sink, with source resistance to set the transconductance. To further reduce transistor dissipation, especially at lower voltages, R116 is placed in series. Current drawn by the Linear Sink can be measured on J12, according to: I=V(J12)/4.4Ω. This measurement is used during calibration and adjustment to determine if the resistors are being switched in correctly at different voltages and currents.

Finally, the resistor switch circuit is shown in FIG. 8. Note that this module has multiple instances, for multiple resistors; the reference designators shown are for the first unit only. The subsequent instances have auto-generated designators, but the circuit remains the same.

Originally, the inverter gate (part of IC6, IC7) was to appear between ✱ and ▢, however difficulties with the EDA tools forced them to the higher level as whole-chip parts (hence, Y was added to bring the connection back inside the module). It was decided to keep this sheet as-is otherwise, making the ✱ an output (as detailed in the table at the beginning of this section), though its original purpose was as an input.

Anyway, the IC5 outputs are effectively open-collector, so a pullup resistor is required (R77, etc.). This active-low signal is inverted by IC6 or IC7, and coupled to the switching transistor (Q2, etc.) through a 1 k gate resistor. A 12V zener diode protects the gate and inverter in case of large voltage transients (in addition to the main input protection circuitry shown earlier).

The transistors are switching resistive loads up to 250 V, 250 mA.

Adjusting the Current Sink.

For correct operation, the gain and offset of the resistor switches needs to be adjusted so that they are switched at the correct operating voltages and currents.

FIG. 8a-c show FIG. 8a Current too high, FIG. 8b Optimal Setting and FIG. 8c Current too low. FIGS. 8a-c illustrate ILIN waveforms corresponding to adjustment of R47 I RANGE. When current is too high, it can be dangerous for the linear sink, Q15. When current is too low (clipping to zero), total current becomes discontinuous and regulation is lost. Top trace: VC input, 1 V/div; bottom trace: ILIN, 0.5 V/div (10_ probe); horizontal: 2 ms/div.

Set the signal generator for 360 Hz, triangle function, 0 to −0.5 V lower peak, 2.5 to 3 V positive peak (note: verify levels with oscilloscope). Using appropriate cables and tees, connect the output to the oscilloscope TRIG input, then to the device under test, from J4 VC to Gnd. (If the signal generator has a SYNC or TRIG output, it can be connected to the oscilloscope TRIG input with a separate cable.)

Set the oscilloscope for 2 ms/div horizontal timebase, 1 V/div vertical gain, DC coupling. Adjust the trigger settings until a stable display of the signal generator waveform is visible. Adjust the signal generator until the voltage levels are correct.

Clip an oscilloscope probe onto J22 ILIN. Clip the probe ground onto a circuit ground, such as D9 anode. Connect the probe to the oscilloscope, and set the oscilloscope for 0.5 V/div vertical gain (accounting for the probe gain if necessary).

Connect the high voltage power supply to J2 (note: observe polarity), in series with the DC ammeter. Set the output for 100 to 120 VDC. Note: turn the power supply on only while taking measurements.

Turn on the high voltage power supply, press stp/rst to clear any faults, then press START to begin the test. Adjust R47 I range to obtain a level waveform as in FIG. 8a-c. Turn the high voltage power supply back off. (If the waveform doesn't appear consistent and stable, it may be due to supply ripple; adjust the signal generator's frequency very slightly until the ripple stands still.)

Calibrate IFB.

Disconnect the signal generator and oscilloscope from the device under test. Tie Vc tp Vref. Measure the voltage on J4 pin 2 Iout. Turn on the high voltage power supply.

This process describes a two point, linear, slope-offset calibration of the current feedback amplifier.

1. Adjust the power supply voltage until the ammeter reads 0.500±0.005 A (this should require around 25 V, but the amount is not important).
2. Adjust R46 IFB GAIN until IOUT voltage reads 1.00±0.01 V.
3. Adjust the power supply until the ammeter reads 1.00±0.01 A.
4. Note the difference at IOUT between measured and desired voltage: it should read 2.00 V now. If it reads above, adjust R46 until it reads below by the same amount, or vice versa.
5. Adjust R44 IFB OFFS until IOUT reads 2.00±0.02 V.

Repeat this process several times until the measurements converge within the stated ranges. Turn off the high voltage power supply.

Variations: this test can be performed with any convenient pair of operating points, as long as the greater is twice the smaller. All numbers are scaled linearly in that case.

If an ammeter is not available, the internal current shunt resistor R37 can be used as a reference, however the resulting gain accuracy will be only 3%, the accuracy of the resistor. In this case, measure the voltage across R37 and divide by its resistance (0.2Ω) to get amperes.

FIG. 13 illustrates circuits for variable current rate chargers. As in variable rate discharging, it is desirable to charge at a variable rate also, to maximize the reconditioning of the battery.

In FIG. 13 this is a circuit diagram for a variable current output charging system with user input to select between different charging profiles. PSU in FIG. 13 the diagram represents power supplies. Some power supplies may provide 12V DC output, while others may produce more, perhaps 48V DC, 100V DC, or more. Sub circuit including Q1 is a FET that will allow the control chip (IC1) to use a PWM signal to increase or decrease the current flowing from the power supplies to the Load. There may be two or more Sub circuits B to allow for regulation of multiple power supplies. Sub circuit with Op amp is a feedback signal used by the control chip (IC1) to monitor the current being delivered. Based on this feedback Sub circuit Q1 is controlled. Sub circuit U2 is a wireless data logging I/O interface that may enable data logging via WiFi or BT or hardwire. Sub circuit S1 is part of the user input. By pressing the momentary switch button in S1, the system will output one of the five LEDs on LED1-4. Each option will correspond to a vehicle battery charging profile. There also may be a second momentary switch button (not shown) that allows the user to toggle between profiles which may vary according to the specific requirements of that vehicle type. One of these profiles may be for the battery reconditioning charging process and the other may be for a PHEV style charging profile. Although the present invention has been described, it is apparent to those skilled in the art that a variety of modifications and changes may be made without departing from the scope of the present invention which is intended to be defined by the appended claims.

The invention claimed is:
1. A rechargeable battery reconditioning system comprising first and second parts:
   A. a first part of a battery rebalancing and charge capacity restoring system having:
      a. a first charging routine configured to charge the battery increasing toward a voltage above the normal maximum manufacture rated operating voltage rating for the battery;

b. a battery temperature monitoring system configured to measure and monitor the temperature of the battery and to produce an output signal proportional to battery temperature;

c. a cooling system, responsive to said temperature monitoring system configured to cool said battery in response to said output signal; wherein the amount of cooling is dynamically adapted to said proportional signal; and d. the battery temperature monitoring system configured to simultaneously monitor the battery voltage and temperature during charging and terminating charging if, once the battery voltage reaches said maximum voltage and then drops, while the battery temperature increases;

B. a second part of a battery rebalancing and charge capacity restoring discharging system having a. a plurality of parallel fixed resistive loads switchable between in-circuit and out of circuit with the battery;

b. a circuit having a variable load in parallel with said plurality of resistive loads;

c. a first controller configured to switch in or out of circuit at least one resistive load to discharge the battery and to switch in circuit or out of circuit additional resistive loads to alter the discharge rate according to a predetermined discharge rate schedule;

d. a second controller controlling said variable load, and adjusting the variable load to increase the load to gradually increase the load between the addition of resistive loads, thereby applying a gradual increase in loads between step wise increase from switching in successive resistive loads; and e. a third controller configured to control said variable load, and adjusting the variable load to decrease the combined load of variable when a fixed resistive loads is removed from the circuit by said first controller when to gradually decrease the load between the removal of resistive loads, thereby applying a gradual decrease in loads between step wise decreases in load from switching out successive resistive loads.

2. A rechargeable battery reconditioning system comprising:

a battery reconditioner including:

a. a charging routine configured to charge the battery increasing toward a voltage above the normal maximum manufacture rated operating voltage rating for the battery;

b. a controller configured to control the current flow to the battery from a predetermined rate to a decreasing current rate as the battery approaches said maximum operating voltage;

c. a battery temperature monitoring system configured to measure and monitor the temperature of the battery and for producing an output signal proportional to battery temperature; and d. a cooling system, responsive to said temperature monitoring system configured to cool said battery in response to said output signal; wherein the amount of cooling is dynamically adapted to said proportional signal.

3. The system of claim 2 wherein the charging routine terminates charging if after the battery reaches said maximum voltage, the battery voltage drops, and the battery temperature increases at the time the voltage drops.

4. The system of claim 2 where the battery charging terminates when the battery voltage reaches a predetermined voltage over said maximum voltage.

5. The system of claim 2 wherein the current flow to the battery is tapered as it approached said voltage maximum.

6. A rechargeable vehicle battery charge restoration system comprising:

a. a cooling device configured to cool the battery;

b. a first circuit configured to discharge the battery at a first current rate until a first voltage threshold is reached;

c. a second circuit configured to discharge the battery at a second current rate until a second voltage threshold is reached;

d. a third circuit configured to charge the battery at a third current rate until a third voltage threshold is reached;

e. a fourth circuit, powered externally of the vehicle, configured to charge the battery at a fourth current rate until a fourth voltage threshold is reached; said fourth voltage being greater than the maximum rated voltage of the battery;

f. a cooling circuit, powered externally of the vehicle, configured to connect a cooling device the cooling device to be powered from the rebalancer and removed from electrical connection with the vehicle; said cooling circuit being configured to gradually increase current flow to the cooling device at initiation of cooling; and g. at completion of charging said cooling circuit restoring the connection between the vehicle and cooling device and removing the connection between the cooling circuit and the cooling device;

whereby the battery is at least partially restore to hold a charge.

7. The system of claim 6 wherein said current rates are fixed rates.

8. The system of claim 6 wherein said current rates are variable rates which change over time.

9. The system of claim 6 wherein said circuits for discharging include fix and variable circuits for varying the rate of discharge.

10. The system of claim 6 wherein at least one of said circuits is configured to discharge the battery to a voltage below the voltage preset by the vehicle as an indication of a fully discharged battery.

* * * * *